United States Patent

Matama

[11] Patent Number: 5,905,817
[45] Date of Patent: May 18, 1999

[54] IMAGE REPRODUCING METHOD AND APPARATUS USING DYNAMIC RANGE COMPRESSION BASED ON AN UNSHARP SIGNAL GENERATED BY IIR FILTER

[75] Inventor: Tooru Matama, Kanagawa-ken, Japan

[73] Assignee: Fuji Photo Film Co., Ltd., Kanagawa-ken, Japan

[21] Appl. No.: 08/770,274

[22] Filed: Dec. 20, 1996

[30] Foreign Application Priority Data

Dec. 25, 1995 [JP] Japan ..................... 7-337509

[51] Int. Cl.$^6$ .............. G06T 5/00; G06T 5/40; G06T 3/40; H04N 1/409; H04N 1/58; H04N 1/60
[52] U.S. Cl. ............. 382/260; 382/264; 382/274; 382/168; 382/298; 358/520; 358/522
[58] Field of Search .................... 382/260, 264, 382/254, 167, 162, 168, 274, 298; 358/520, 521, 522, 518, 451

[56] References Cited

U.S. PATENT DOCUMENTS

| | | |
|---|---|---|
| 5,012,333 | 4/1991 | Lee et al. .................. 358/520 |
| 5,317,427 | 5/1994 | Ichikawa ................... 358/520 |
| 5,454,044 | 9/1995 | Nakajima .................. 382/260 |
| 5,471,987 | 12/1995 | Nakazawa .................. 600/436 |
| 5,608,813 | 3/1997 | Nakajima .................. 382/260 |
| 5,774,599 | 6/1998 | Muka et al. ............... 382/254 |

FOREIGN PATENT DOCUMENTS

| | | |
|---|---|---|
| 0377386 | 7/1990 | European Pat. Off. . |
| 0732669 | 9/1996 | European Pat. Off. . |

*Primary Examiner*—Scott Rogers

[57] ABSTRACT

A filtering process is carried out on an image signal representing a color image and with an infinite impulse response (IIR) filter to form an unsharp image signal, which represents an unsharp image of the color image. Dynamic range compressing is performed out on the image signal in accordance with the unsharp image signal, and a processed image signal is thereby obtained. A visible image is reproduced from the processed image signal. The dynamic range compressing process can be carried out with relatively few line memories such that the apparatus for carrying out the processing may be kept small, and the printed image having good image quality can thereby be obtained.

22 Claims, 15 Drawing Sheets

- $\tau_{LPF}$ : GROUP DELAY CHARACTERISTICS OF LPF
- $\tau_{ap1}$ : GROUP DELAY CHARACTERISTICS OF ALL-PASS FILTER 1
- $\tau_{ap2}$ : GROUP DELAY CHARACTERISTICS OF ALL-PASS FILTER 2
- $\tau_{ap3}$ : GROUP DELAY CHARACTERISTICS OF ALL-PASS FILTER 3
- $\tau_{ap4}$ : GROUP DELAY CHARACTERISTICS OF ALL-PASS FILTER 4

$H_{LPF}(Z_2)$ $\begin{pmatrix} b = 2r\cos\theta \\ c = r^2 \end{pmatrix}$ $H_{api}(Z_2)$ $(i = 1, 2, \ldots, n)$

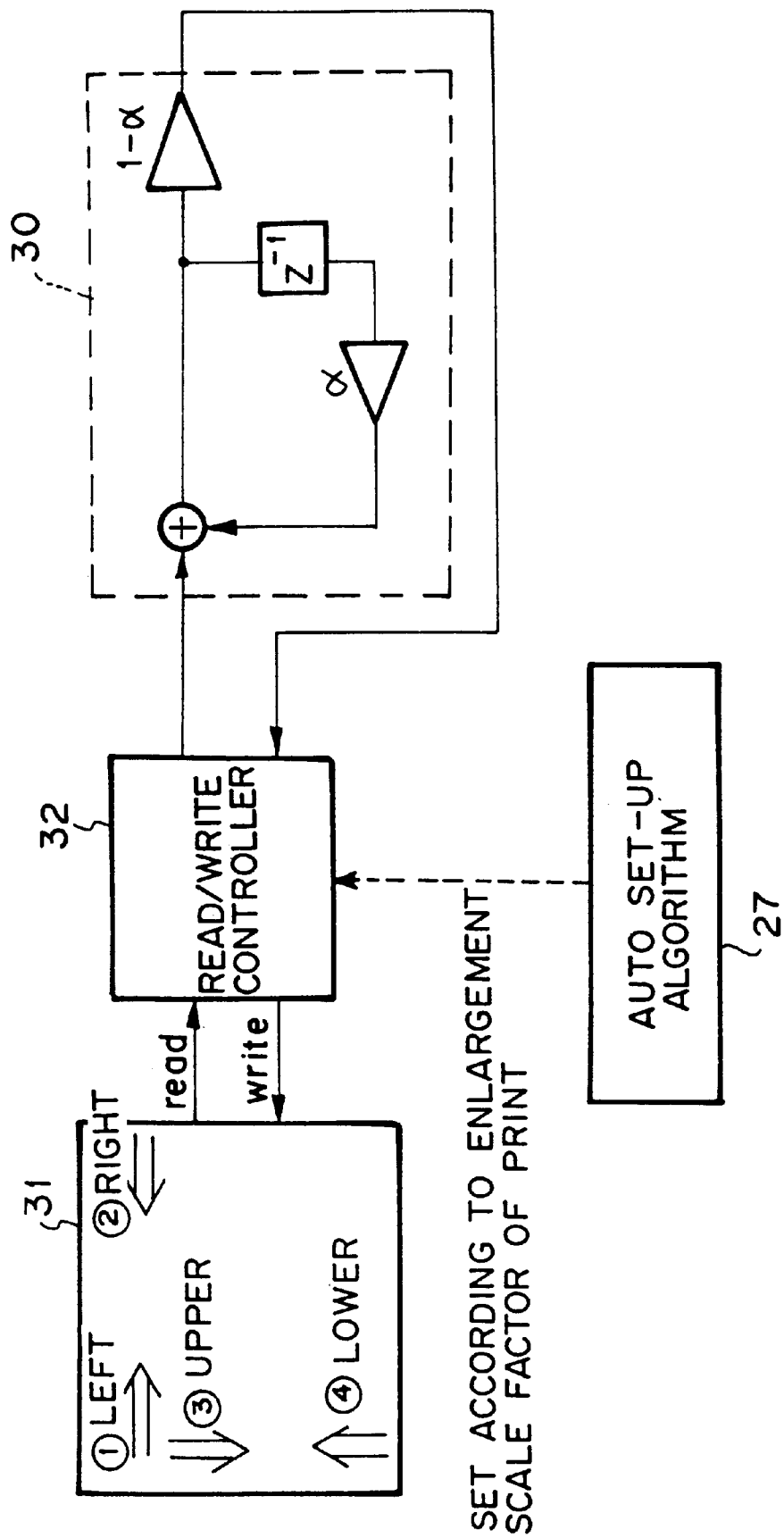

IMAGE REPRODUCING METHOD AND APPARATUS USING DYNAMIC RANGE COMPRESSION BASED ON AN UNSHARP SIGNAL GENERATED BY IIR FILTER

BACKGROUND OF THE INVENTION

1. Field of the Invention

This invention relates to an image reproducing method and apparatus for reproducing a visible image from an image signal, which is obtained from a color image carried on a reflection type of image storage sheet, such as a photograph or printed matter, or a transmission type of image storage sheet, such as negative film or reversal film.

2. Description of the Prior Art

Recently, research has been performed in the area of digital photo printers. In digital photo printers, an image recorded on photographic film (hereinbelow referred to as the film), such as negative film or reversal film, or on printed matter is photoelectrically read out, and an image signal thus obtained is converted into a digital signal. The digital signal is then subjected to various kinds of image processing, and a processed image signal is thereby obtained. Thereafter, recording light is modulated with the processed image signal, and a photosensitive material, such as photographic paper, is scanned with and exposed with the modulated recording light. In this manner, a visible image is printed on the photosensitive material.

With the digital photo printers, layout of printed images, such as combining a plurality of images, division of an image, editing of characters and images, and various other kinds of image processing, such as color/image density adjustment, conversion of magnification, and contour emphasis, can be carried out freely. Therefore, prints may be edited and processed freely in accordance with such a system. In cases where the conventional surface exposure techniques are employed, image density information recorded on film, or the like, cannot be reproduced perfectly due to limitation imposed by the reproducible image density range of photosensitive materials. However, with digital photo printers, prints can be obtained such that the image density information recorded on film, or the like, can be reproduced nearly perfectly.

Basically, the digital photo printers are formed of a read-out means for reading out an image having been recorded on an image storage sheet, such as film, and an image reproducing means. The image reproducing means carries out image processing on the image signal having thus been detected by the read-out means, and adjusts exposure conditions. Also, the image reproducing means carries out a scanning exposure operation on a photosensitive material under the adjusted exposure conditions and carries out development processing on the exposed photosensitive material. Further, the image reproducing means can reproduce a visible image from the image signal having been obtained from the image processing and can display the visible image on a monitor.

For example, in a read-out apparatus for reading out an image recorded on film, or the like, wherein slit scanning is carried out, reading light having a slit-like shape extending in a one-dimensional direction is used to irradiate the film, and the film is moved in a direction, which is approximately normal to the one-dimensional direction of the reading light. (Alternatively, the reading light and a photoelectric converting device are moved in the direction, which is approximately normal to the one-dimensional direction.) In this manner, the film is scanned in two-dimensional directions. An image of the light, which has passed through the film and carries the film image information, is formed on a light receiving face of the photoelectric converting device, such as a CCD line sensor, and is thus photoelectrically converted into a light amount signal. The thus detected light amount signal is amplified and is then converted into a digital signal by an analog-to-digital converter. Thereafter, the digital signal is subjected to various kinds of image processing, such as compensation for a fluctuation in the characteristics among the CCD elements of the CCD line sensor, image density conversion, and conversion of magnification, and a processed signal obtained from the image processing is transferred to a reproducing means.

In the reproducing means, for example, a visible image is reproduced from the received image signal and displayed on a display device, such as a cathode ray tube (CRT) display device. When necessary, the operator, who views the reproduced image, corrects the gradation, the color, the image density, or the like, of the reproduced image (i.e., sets the set-up conditions). In cases where the reproduced image is judged to be acceptable as a finished print, the image signal is transferred as the recording image information into a development means or a monitor.

In an image reproducing apparatus, in which the image reproduction with raster scanning (i.e., light beam scanning) is utilized, three kinds of light beams corresponding to exposure of the layers (which are formed on a photosensitive material and are sensitive to three primary colors, e.g. red (R), green (G), and blue (B)) are modulated in accordance with the recording image information and deflected in a main scanning direction (which corresponds to the aforesaid one-dimensional direction). Also, the photosensitive material is conveyed in a sub-scanning direction, which is approximately normal to the main scanning direction. (The photosensitive material is thus moved with respect to the deflected light beams and in the sub-scanning direction.) In this manner, the photosensitive material is scanned in two-dimensional directions with the light beams, which have been modulated in accordance with the recording image information, and the image having been read out from the film is thereby reproduced on the photosensitive material.

The photosensitive material having thus been scanned with and exposed to the light beams is then subjected to development processing in accordance with the kind of the photosensitive material. For example, in cases where the photosensitive material is a silver halide photographic material, it is subjected to the development processing comprising the steps of color development, bleach-fixing, washing, drying, and the like. A finished print is thereby obtained.

Such a photosensitive material can record a comparatively wide range of luminance of the object. However, the maximum image density on the photosensitive material is limited. Therefore, in cases where a print of a scene having a large difference in luminance is obtained with an ordinary printing technique, details become imperceptible due to insufficient gradation in either a bright portion (a highlight) or a dark portion (a shadow) on the print. For example, in cases where a picture of a person is taken against the light, if the picture is printed such that the image of the person may become clear, the bright portion, such as the sky region, will become white and its details will become imperceptible. Also, if the picture is printed such that the bright portion, such as the sky region, may become clear, the image of the person will become black and its details will become imperceptible. In order to solve the problems, a shutting light technique or a masking print technique has heretofore been employed.

With the shutting light technique, an ordinary level of exposure is given to a region having an intermediate level of image density in a scene. Also, a long time of exposure is given selectively to a region, which is to become white and the details of which are considered to become imperceptible on the print, by using a perforated blocking sheet. Further, as for a region, which is to become black and the details of which are to become imperceptible on the print, the exposure time is kept short selectively by using a blocking sheet. In this manner, the print is obtained such that the contrast of each object may be kept appropriate, and the details of the highlight and the shadow may be kept perceptible. A method has been proposed, in which unsharp image film having been photographically formed by the negative-positive reversal of original image film is used as a blocking sheet for locally controlling the exposure time, and in which the printing is carried out by superposing the original image film and the unsharp image film one upon the other.

Also, various masking print techniques have been proposed in, for example, Japanese Unexamined Patent Publication Nos. 58(1983)-66929 and 64(1989)-35542 and Japanese Patent Publication No. 64(1989)-10819. With the proposed masking print techniques, the same effects as those of the shutting light technique can be obtained by locally changing the brightness of a light source for illuminating a photographic original image.

With the apparatus proposed in Japanese Unexamined Patent Publication No. 58(1983)-66929, a CRT is employed as the illuminating light source, and a photometric operation with memory scanning is carried out on an original image. In this manner, an unsharp mask signal is formed from the color original image. In an exposure mode, a CRT is controlled with the unsharp mask signal, and the contrast is thereby controlled such that the original image maybe reliably recorded within the contrast reproduction limit of a photosensitive material.

With the apparatus proposed in Japanese Unexamined Patent Publication No. 64(1989)-35542, a CRT is employed as the illuminating light source, and an optical path for the photometric operation carried out on an original image and an optical path for the exposure of a photosensitive material are provided such that they may be changed over to each other. Also, a signal for controlling the luminance of the CRT during the exposure and thereby correcting the gradation and the saturation of the reproduced image is formed in accordance with the photometric signal obtained from the original image. Further, a signal for displaying the reproduced image on a monitor is formed. The image displayed on the monitor is viewed, and the amount of light of the CRT is thereby controlled such that a desired image may be reproduced.

With the apparatus proposed in Japanese Patent Publication No. 64(1989)-10819, a matrix device, such as a liquid crystal, which is capable of locally changing the light transmittance, is located between a uniform surface light source and an original image. The transmittance of the liquid crystal is controlled in accordance with the photometric signal obtained from the original image, and the contrast of the reproduced image is thereby adjusted.

Further, for example, in Japanese Unexamined Patent Publication No. 6(1994)-242521, a method is proposed wherein, in order for the gray balance in image reproduction to be corrected, conversion is carried out such that the maximum image density value and the minimum image density value of each color on an original image may become equal to predetermined values on the reproduced image. With the proposed method, the control of the gradation can be carried out for each of the frames of film. Therefore, as for a scene having a large difference in luminance, the gradation of the entire area of the image can be rendered soft such that the range of luminance of the scene may fall within the dynamic range of the photosensitive material. In this manner, the problems can be prevented from occurring in that the details of the highlight and the shadow become imperceptible due to insufficient gradation.

However, with the aforesaid shutting light technique and the aforesaid masking print techniques, the blocking sheet must be prepared and used regardless of the image, which is to be reproduced. Therefore, a very high level of processing is required. Also, considerable labor and time are required to form the unsharp image film, and the printing efficiency cannot be kept high.

Also, with the aforesaid apparatuses described in Japanese Unexamined Patent Publication Nos. 58(1983)-66929 and 64(1989)-35542 and Japanese Patent Publication No. 64(1989)-10819, the contrast of a comparatively large structure can be reproduced by adjusting with the distribution of the luminance of the illuminating light source. However, local structures in the reproduced image correspond to the projected image of the original image film. Therefore, the aforesaid apparatuses have the drawbacks in that the reproduction of colors of the local structures, including their edges, cannot be controlled freely, in that the sharpness of the edges cannot be controlled freely, and in that the gradation of over-exposure portions, under-exposure portions, or the like, in the original image cannot be controlled freely.

Further, with the aforesaid apparatuses described in Japanese Unexamined Patent Publication Nos. 58(1983)-66929 and 64(1989)-35542 and Japanese Patent Publication No. 64(1989)-10819, the processing for the photometric operation and the exposure is carried out sequentially. Therefore, the problems occur in that the processing capacity cannot be kept high. Also, the problems occur in that, in cases where the distance of movement of the original image becomes different between when the photometric operation is carried out and when the exposure is carried out, the printed image becomes disturbed. Further, with the apparatus described in Japanese Patent Publication No. 64(1989)-10819, wherein the liquid crystal is used, since the transmittance of the liquid crystal is at most approximately 30%, the exposure time cannot be kept short. Furthermore, the tube surface of the CRT is covered with glass, and the side inward from the glass becomes luminous. Therefore, even if the film is brought into close contact with the tube surface of the CRT, a spacing will substantially occur between the luminous surface of the CRT and the film. Accordingly, with the apparatus proposed in Japanese Unexamined Patent Publication No. 64(1989)-35542, wherein the image represented by the photometric signal is displayed, a blur occurs with the photometric and image forming system due to the spacing between the luminous surface of the CRT and the film surface during the photometric operation, and therefore a clear monitor image cannot be obtained.

With the method proposed in Japanese Unexamined Patent Publication No. 6(1994)-242521, even though the problems can be prevented from occurring in that the details of the highlight and the shadow become imperceptible due to insufficient gradation, the problems occur in that the contrast of each object becomes weak and the printed image becomes monotonous.

Therefore, novel image reproducing methods have been proposed, wherein an unsharp image signal, which represents only the structures of low frequencies in a color image, is subtracted from a digital image signal representing the color image, a difference signal being thereby obtained, processing for changing the image density, the saturation, and/or the gradation is carried out on the difference signal, and a visible image is reproduced by an image reproducing means from a processed image signal, which has been obtained from the processing carried out on the difference signal. In this manner, even if the contrast of the entire area of the original image is strong, a reproduced image can be obtained such that the contrast of the entire area of the image may be weakened, such that the contrasts of fine structures in the highlight and the shadow in the image may remain, and such that the details of the highlight and the shadow can be prevented from becoming imperceptible in the reproduced image due to insufficient gradation. Such image reproducing methods are described in, for example, Japanese Unexamined Patent Publication No. 2(1990)-226375 and U.S. Ser. No. 08/672,939.

In the image reproducing methods descried above, a filtering process is carried out on the image signal by using a low-pass filter, and an unsharp image signal is thereby obtained. However, if the size of the low-pass filter is very small, the sharpness of the resulting processed image will be emphasized unnaturally, and the same effects as those obtained with the aforesaid shutting light technique cannot be obtained. Therefore, in the image reproducing methods described above, the filtering process is carried out by using a filter having a comparatively large size (for example, a size of approximately 100×100). However, in cases where the unsharp image signal is formed with the low-pass filter, it is necessary for the processing to be carried out not only along the horizontal direction of the image but also along the vertical direction of the image. Accordingly, for the formation of the unsharp image signal, a number of line memories, which number is equal to the mask size minus 1, must be used (for example, in cases where the filter size is equal to 100×100, 99 line memories must be used). As a result, the size of the apparatus for carrying out the processing cannot be kept small.

SUMMARY OF THE INVENTION

The primary object of the present invention is to provide an image reproducing method wherein a dynamic range compressing process is carried out such that the apparatus for carrying out the processing may be kept small, and wherein the printed image having good image quality is thereby obtained.

Another object of the present invention is to provide an image reproducing method, wherein the color reproducibility in a printed image is enhanced such that an unnatural feeling may not occur at portions in the vicinity of edges in the printed image, and wherein the printed image having good image quality is thereby obtained even from an original image having a strong low frequency contrast.

The specific object of the present invention is to provide an apparatus for carrying out the image reproducing method.

Firstly, characteristics of an infinite impulse response filter (hereinbelow referred to as the IIR filter) will be described hereinbelow. In cases where the frequency characteristics of a system for carrying out a filtering process are represented by $H(e^{jw})$, group delay characteristics $\tau(e^{jw})$ of the system are defined by Formula (1) shown below.

$$\tau(e^{jw}) = -d\{\arg[H(e^{jw})]\}/dw \qquad (1)$$

wherein w represents the frequency. An ordinary type of unsharp mask filter is the finite impulse response filter (hereinbelow referred to as the FIR filter). The group delay characteristics of the FIR filter are flat over the entire frequency band. On the other hand, though the IIR filter has a very short weight sequence, if the feedback process, which will be described later, is carried out, the IIR filter can achieve the processing equivalent to the processing of a filter having a long weight sequence. In general, with the IIR filter, the group delay characteristics do not become flat, and a phase distortion occurs in the signal obtained from the processing. However, a technique has been proposed, wherein an IIR type of low-pass filter having certain amplitude characteristics and an IIR type of all-pass filter are connected with each other in a cascade arrangement, and wherein the group delay characteristics in the band passing through the low-pass filter are thereby rendered flat. Such a technique is proposed in, for example, "Digital Signal Processing" by Oppenheim & Schafer, p. 235, FIG. 5.29. In an image reproducing method and apparatus in accordance with the present invention, an unsharp image signal is formed in accordance with the technique described in "Digital Signal Processing."

Specifically, the present invention provides a first image reproducing method, wherein a visible image is reproduced from a digital image signal representing a color image, the method comprising the steps of:

i) carrying out a filtering process on the image signal with an IIR filter, an unsharp image signal, which represents an unsharp image of the color image, being thereby formed, ii) carrying out a dynamic range compressing process on the image signal in accordance with the unsharp image signal, a processed image signal being thereby obtained, and iii) reproducing a visible image from the processed image signal.

The present invention also provides a first image reproducing apparatus, wherein a visible image is reproduced from a digital image signal representing a color image, the apparatus comprising:

i) an unsharp image signal forming means for carrying out a filtering process on the image signal with an IIR filter, and thereby forming an unsharp image signal, which represents an unsharp image of the color image, ii) a dynamic range compressing process means for carrying out a dynamic range compressing process on the image signal in accordance with the unsharp image signal, and thereby obtaining a processed image signal, and iii) reproduction means for reproducing a visible image from the processed image signal.

The first image reproducing method and the first image reproducing apparatus in accordance with the present invention should preferably be modified such that a histogram of the image signal may be formed, a dynamic range of the image signal may be calculated in accordance with the histogram, a rate of dynamic range compression corresponding to the image signal may be set in accordance with the dynamic range, and the dynamic range compressing process may be carried out in accordance with the rate of dynamic range compression.

Also, in the first image reproducing method and the first image reproducing apparatus in accordance with the present invention, the IIR filter should preferably comprise a low-pass type of IIR filter and an all-pass type of IIR filter, which are connected with each other in a cascade arrangement.

Further, the first image reproducing method and the first image reproducing apparatus in accordance with the present invention should preferably be modified such that the image signal may be converted into a luminance signal, the filtering process may be carried out on the luminance and with the IIR filter, and the unsharp image signal may thereby be formed.

The present invention further provides a second image reproducing method, wherein a visible image is reproduced from a digital image signal representing a color image, the method comprising the steps of:

i) carrying out a filtering process on the image signal with an IIR filter such that the filtering process may proceed forward and backward at least a single time with respect to a predetermined direction on the color image or with respect to each of the predetermined direction and a direction different from the predetermined direction, an unsharp image signal, which represents an unsharp image of the color image, being thereby formed, ii) carrying out a dynamic range compressing process on the image signal in accordance with the unsharp image signal, a processed image signal being thereby obtained, and iii) reproducing a visible image from the processed image signal.

The present invention still further provides a second image reproducing apparatus, wherein a visible image is reproduced from a digital image signal representing a color image, the apparatus comprising:

i) unsharp image signal forming means for carrying out a filtering process on the image signal with an IIR filter such that the filtering process may proceed forward and backward at least a single time with respect to a predetermined direction on the color image or with respect to each of the predetermined direction and a direction different from the predetermined direction, the unsharp image signal forming means thereby forming an unsharp image signal, which represents an unsharp image of the color image, ii) dynamic range compressing process means for carrying out a dynamic range compressing process on the image signal in accordance with the unsharp image signal, thereby obtaining a processed image signal, and iii) reproduction means for reproducing a visible image from the processed image signal.

The second image reproducing method and the second image reproducing apparatus in accordance with the present invention should preferably be modified such that a histogram of the image signal may be formed, a dynamic range of the image signal may be calculated in accordance with the histogram, a rate of dynamic range compression corresponding to the image signal may be set in accordance with the dynamic range, and the dynamic range compressing process may be carried out in accordance with the rate of dynamic range compression.

Also, in the second image reproducing method and the second image reproducing apparatus in accordance with the present invention, the visible image reproduced from the processed image signal should preferably be enlarged with a predetermined enlargement scale factor.

Further, in the second image reproducing method and the second image reproducing apparatus in accordance with the present invention, a filter factor of the IIR filter should preferably be altered in accordance with the predetermined enlargement scale factor.

Furthermore, in the second image reproducing method and the second image reproducing apparatus in accordance with the present invention, the number of times of the filtering process carried out with the IIR filter should preferably be altered in accordance with the predetermined enlargement scale factor.

Also, the second image reproducing method and the second image reproducing apparatus in accordance with the present invention should preferably be modified such that the image signal may be converted into a luminance, the filtering process may be carried out on the luminance and with the IIR filter, and the unsharp image signal may thereby be formed.

With the first image reproducing method and the first image reproducing apparatus in accordance with the present invention, wherein the IIR filter is employed as the filter for forming the unsharp image signal, the weight sequence for the filtering process can be kept short, and therefore the size of the means for forming the unsharp image signal can be kept small. Also, the dynamic range compressing process is carried out by using the unsharp image signal, which has been obtained by carrying out the filtering process with the IIR filter. Therefore, the dynamic range compressing process can be carried out such that the size of the image reproducing apparatus may be kept small. Further, with the dynamic range compressing process, the details of a highlight and a shadow in the image do not become imperceptible, and the contrast of an image portion, in which the low frequency contrast is weak, is not weakened. Accordingly, a reproduced image having good image quality can be obtained.

Also, in cases where the IIR filter is formal of the low-pass type of IIR filter and the all-pass type of IIR filter, which are connected with each other in a cascade arrangement, it becomes possible to prevent the problems from occurring in that a phase distortion occurs in the processed image signal due to the use of only the low-pass type of IIR filter.

Further, with the first image reproducing method and the first image reproducing apparatus in accordance with the present invention, the image signal may be converted into the luminance, and the unsharp image signal may be formed in accordance with the luminance. In such cases, the image reproduced from the processed image signal is obtained such that the color reproducibility may be kept good, even though the brightness at the edge of an object in the image may become different from the brightness in the color image. Therefore, an image can be obtained which is free from an unnatural feeling in comparison with the original color image.

In order to eliminate the problems with regard to a phase distortion of an IIR filter, a technique has been proposed wherein a filtering process is carried out two times on an image signal. The technique is described in, for example, "Image Signal Processing for Scientific Measurement" by Akira Kawada & Shigeo Minami, p. 166. With the proposed technique, a first filtering process is carried out so as to proceed from the right side toward the left side of the image, and a second filtering process is carried out so as to return from the left side toward the right side of the image. In such cases, the impulse response of the IIR filter is represented by a symmetric function, the Fourier transform thereof becomes of a real function, and no phase characteristics are imparted. The problems with regard to the phase distortion can thereby be eliminated. Directional properties of the filtering can be avoided by carrying out the filtering process with respect to both of the horizontal direction and the vertical direction on the image, instead of carrying out the filtering process with respect to only a single direction.

The second image reproducing method and the second image reproducing apparatus in accordance with the present invention is based upon the technique described above. With the second image reproducing method and the second image reproducing apparatus in accordance with the present invention, the filtering process is carried out with the IIR filter such that the filtering process may proceed forward and backward at least a single time with respect to the predetermined direction on the image or with respect to each of the predetermined direction and a direction different from the predetermined direction (for example, with respect to the horizontal and vertical directions on the image), and the unsharp image signal is thereby formed. Therefore, even if only the IIR filter is used, a phase distortion can be prevented from occurring in the processed image signal. Also, since only the IIR filter is utilized, the weight sequence during the filtering process can be kept short. Accordingly, the size of the means for forming the unsharp image signal can be kept small. Further, the dynamic range compressing process is carried out by using the unsharp image signal, which has been obtained by carrying out the filtering process with the IIR filter. Therefore, the dynamic range compressing process can be carried out such that the size of the image reproducing apparatus may be kept small. Furthermore, with the dynamic range compressing process, the details of highlight and shadow in the image do not become imperceptible, and the contrast of an image portion, in which the low frequency contrast is weak, is not weakened. Accordingly, a reproduced image having good image quality can be obtained. Also, with the second image reproducing method and the second image reproducing apparatus in accordance with the present invention, wherein an all-pass filter need not necessarily be utilized, the image reproducing apparatus can be kept simpler than with the first image reproducing method and the first image reproducing apparatus in accordance with the present invention.

BRIEF DESCRIPTION OF THE DRAWINGS

FIG. 18 is a block diagram showing a further different constitution of an LPF in the second embodiment of the image reproducing apparatus in accordance with the present invention.

DESCRIPTION OF THE PREFERRED EMBODIMENTS

The present invention will hereinbelow be described in further detail with reference to the accompanying drawings.

Figure 1:
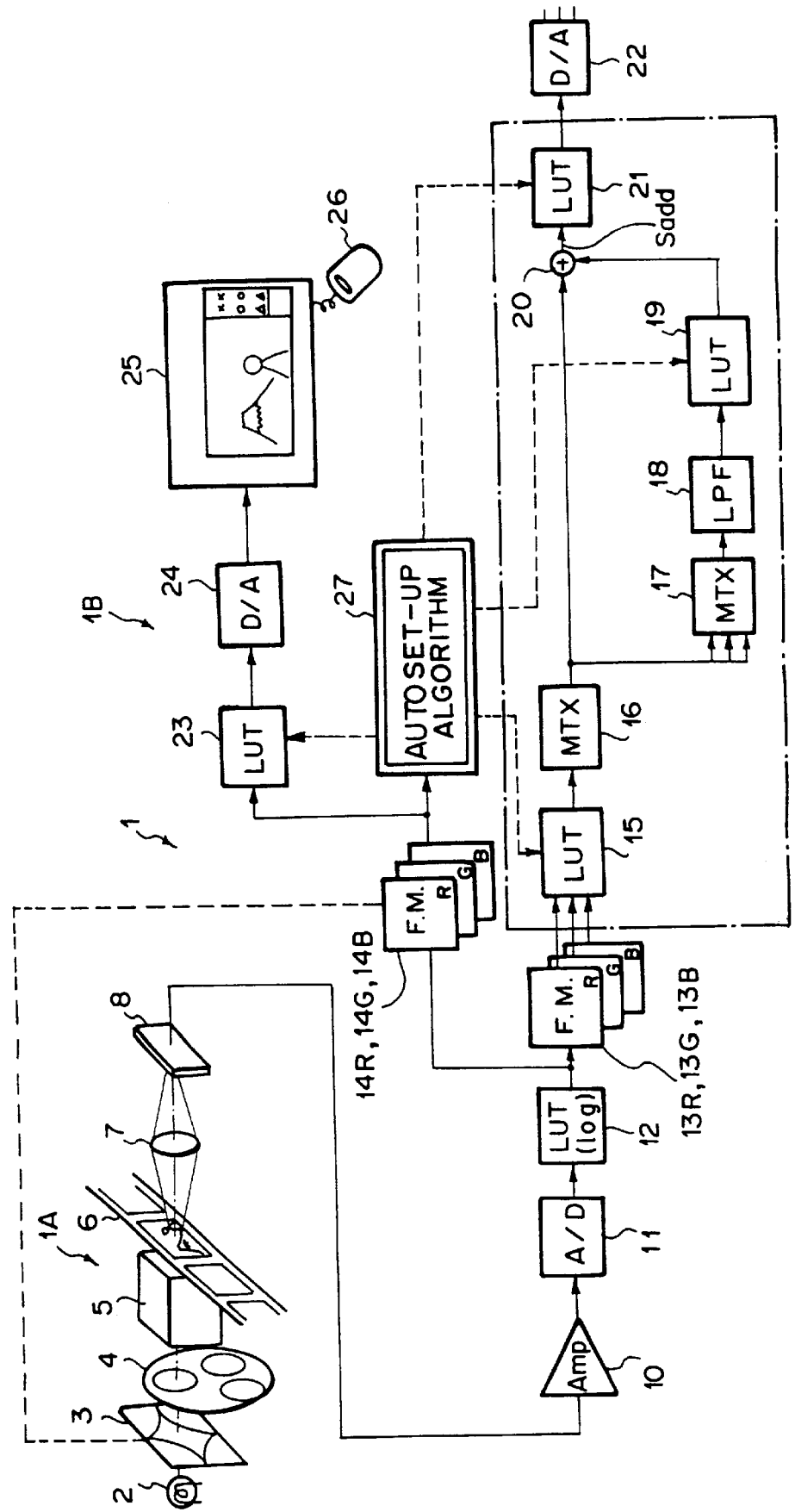
FIG. 1 is an explanatory view showing a first embodiment of the image reproducing apparatus in accordance with the present invention.

FIG. 1 is an explanatory view showing a first embodiment of the image reproducing apparatus in accordance with the present invention. As illustrated in FIG. 1, an image reproducing apparatus 1, which is the first embodiment of the image reproducing apparatus in accordance with the present invention, comprises an image read-out section 1A and an image processing section 1B. The image read-out section 1A comprises a light source 2, and a light regulating means 3 for adjusting the amount of light having been produced by the light source 2. The image read-out section 1A also comprises an RGB filter 4 for converting the light, which has been produced by the light source 2, into R, G, and B three colors, and a mirror box 5 for diffusing the light, which has passed through the RGB filter 4, and irradiating it to film 6. The image read-out section 1A further comprises a lens 7 for forming an image of the light, which has passed through the film 6, on an area type of CCD image sensor 8. In this embodiment, the image read-out operation is carried out with the area type of CCD image sensor 8. Alternatively, a technique for moving a line sensor with respect to the light may be employed. As another alternative, a technique for spot photometry using a drum scanner, or the like, may be employed. In the image read-out section 1A, a preliminary read-out operation and a final read-out operation are carried out. In the preliminary read-out operation, the detection intervals of the CCD image sensor 8 are set to be comparatively coarse, and a preliminary read-out image signal $S_P$ is thereby obtained. After the preliminary read-out operation has been carried out, the final read-out operation is carried out. In the final read-out operation, the detection intervals of the CCD image sensor 8 are set to be comparatively fine, and a final read-out image signal $S_Q$ is thereby obtained.

The image processing section 1B comprises an amplifier 10 for amplifying the R, G, and B three color image signals, which have been detected by the CCD image sensor 8, and an analog-to-digital converter 11 for converting the amplified image signals into digital image signals. The image processing section 1B also comprises a look-up table (LUT) 12 for converting the digital image signals into image density signals, and frame memories 13R, 13G, and 13B, which respectively store the R, G, and B digital image signals having been converted into the image density signals. The image processing section 1B further comprises frame memories 14R, 14G, and 14B for respectively storing R, G, and B preliminary read-out image signals $S_P$, which are obtained in cases where the preliminary read-out operation is carried out. The image processing section 1B still further comprises an LUT 15 for carrying out correction of gray balance, brightness, and gradation, which will be described later, on the digital image signals, and a matrix (MTX) 16 for correcting the image signals, which have been obtained from the processing carried out by the LUT 15, such that they may become the color signals capable of being reproduced in appropriate colors on a photosensitive material, which will be described later. The image processing section 1B also comprises an MTX 17 for converting the image signals, which have been corrected by the MTX 16, into a luminance, and a low-pass filter (LPF) 18 for forming an unsharp image signal from the luminance. The image processing section 1B further comprises an LUT 19 for compressing the dynamic range of the unsharp image signal and thereby obtaining an unsharp image signal for the adjustment of the low frequency contrast, and an addition means 20 for adding the original image signals and the unsharp image signal, which has been obtained from the dynamic range compressing process, to each other and thereby obtaining addition signals Sadd. The image processing section 1B still further comprises an LUT 21 for correcting the contrast (i.e., the low frequency contrast and the high frequency contrast) of the addition signals Sadd, i.e. for carrying out a gradation processing, and a digital-to-analog converter 22 for converting the signals, which have been obtained from the contrast correction, into analog signals. The image processing section 1B also comprises an LUT 23 for correcting the gradation of the preliminary read-out image signals $S_P$, and a digital-to-analog converter 24 for converting the preliminary read-out image signals $S_P$, which have been obtained from the gradation correction carried out by the LUT 23, into analog signals. The image processing section 1B further comprises a CRT display device 25 for reproducing a visible image from the preliminary read-out image signals $S_P$ obtained from the digital-to-analog conversion, and a mouse device 26 for operating the visible image, which is displayed on the CRT display device 25, in order to set ultimate parameters for the image. The image processing section 1B still further comprises an automatic set-up algorithm means 27 for calculating the histogram of the preliminary read-out image signals $S_P$ in the manner, which will be described later, and setting the parameters for the adjustments of the LUT 15, the LUT 19, the LUT 21, and the LUT 23 in accordance with the histogram.

Figure 2A:
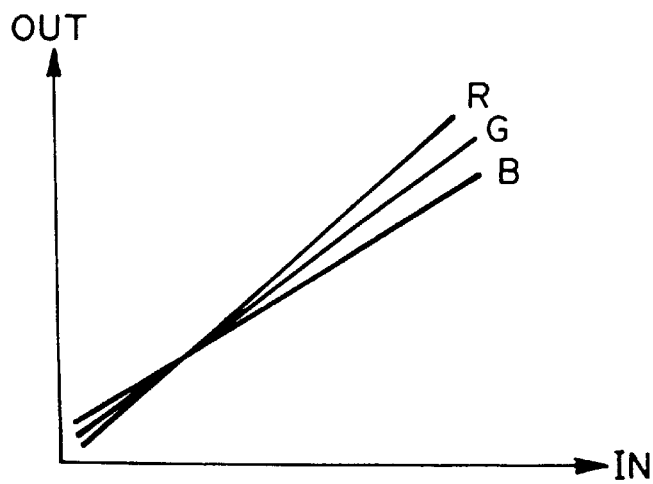
FIG. 2A is a graph showing a table for gray balance adjustment carried out in an LUT 15.
Figure 2B:
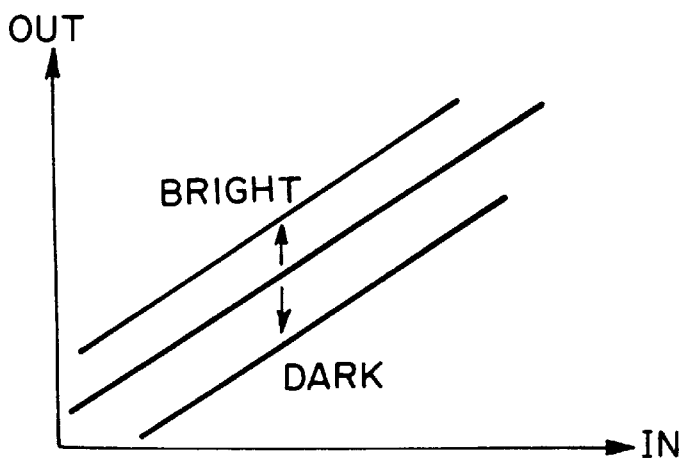
FIG. 2B is a graph showing a table for brightness correction carried out in the LUT 15.
Figure 2C:
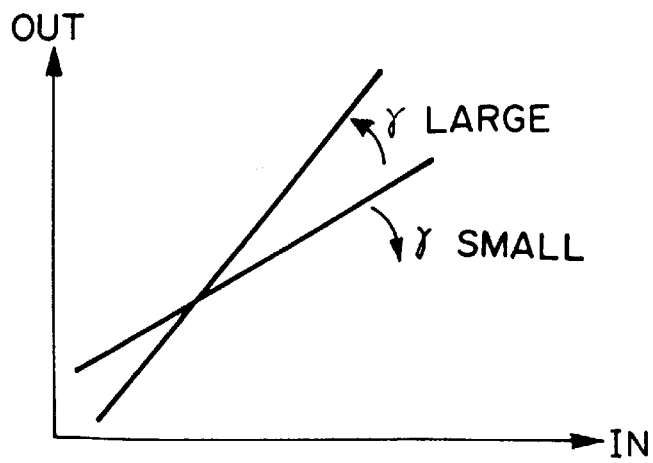
FIG. 2C is a graph showing a table for gradation conversion carried out in the LUT 15.
Figure 3A:
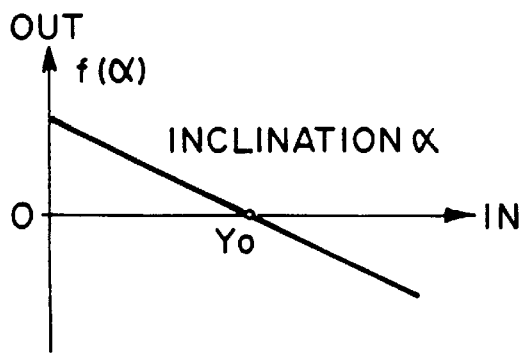
FIGS. 3A, 3B, 3C, 3D, and 3E are graphs showing tables for a dynamic range compressing process carried out in an LUT 19.

The LUT 12 is a transmittance-to-image density conversion table for converting the signals such that saturation may not be reached with respect to the image density range of the original image. The LUT 15 corrects the gray balance, the brightness, and the gradation. The LUT 15 comprises a gray balance adjustment table shown in FIG. 2A, a brightness correction table shown in FIG. 2B, and a γ correction table shown in FIG. 2C, which are connected in series. The LUT 19 stores dynamic range compression tables having predetermined inclinations α shown in FIGS. 3A, 3B, 3C, 3D, and 3E. In this embodiment, α takes a negative value. As will be described later, the dynamic range compression tables are calculated in accordance with the preliminary read-out image signals $S_P$. As illustrated in FIG. 4, the LUT 21 is a non-linear gradation conversion table and represents the relationship between the input signal and a processed image signal representing the reproduced image. The LUT 23 stores a linear gradation conversion table shown in FIG. 5. The inclination of the linear gradation conversion table is equal to 1+α.

The MTX 16 corrects the detected digital image signals such that they may become the color signals capable of being reproduced in appropriate colors on the photosensitive material. Specifically, the MTX 16 corrects the detected digital image signals such that they may be reproduced in appropriate colors by the combination of the spectral characteristics of the film 6 and the spectral characteristics of the photosensitive material, on which the visible image is reproduced ultimately. The MTX 17 converts the R, G, and B color image signals into a luminance. Specifically, the MTX 15 converts the R, G, and B color image signals into the luminance by using a value of one-third of the mean value of each color image signal or by using the YIQ base, or the like.

Figure 6:
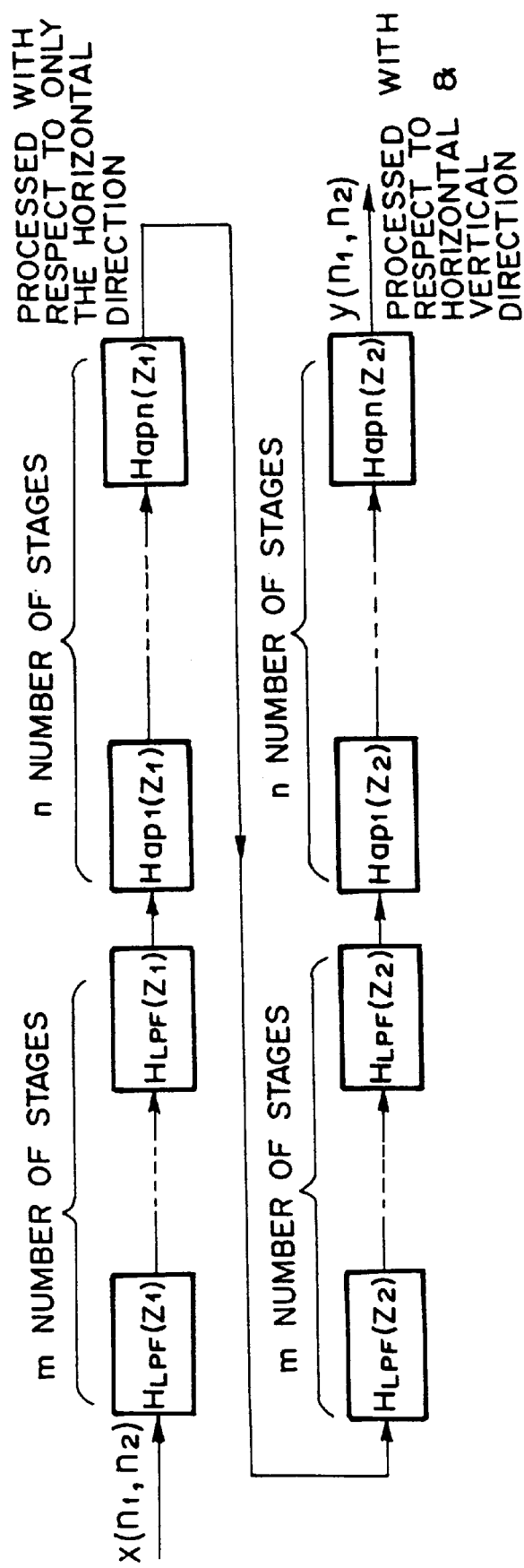
FIG. 6 is a block diagram showing an example of a constitution of an LPF 18.

The LPF 18 carries out a filtering process for blurring the luminance in two-dimensional directions. The LPF 18 is constituted of a system function with respect to a horizontal direction on the original image and a system function with respect to a vertical direction on the original image, which system functions can be separated from each other. As illustrated in FIG. 6, the portion of the LPF 18 for the processing with respect to the horizontal direction on the original image comprises m number of stages of low-pass filters $H_{LPF}$, which are of an IIR type, and n number of stages of all-pass filters $H_{api}$ (where i=1~n), which are of the IIR type. The IIR type of the low-pass filters $H_{LPF}$ and the IIR type of the all-pass filters $H_{api}$ are connected with one another in a cascade arrangement. Also, the portion of the LPF 18 for the processing with respect to the vertical direction on the original image comprises m number of stages of low-pass filters $H_{LPF}$, which are of the IIR type, and n number of stages of all-pass filters $H_{api}$ (where i=1~n), which are of the IIR type. The IIR type of the low-pass filters $H_{LPF}$ and the IIR type of the all-pass filters $H_{api}$ are connected with one another in a cascade arrangement. Specifically, the system function of the LPF 18 can be represented by Formula (2) shown below.

$$H(z1, z2)=H1(z1)-H2(z2) \qquad (2)$$

wherein H1 (z1) represents the system function with respect to the horizontal direction on the image, and H2(z2) represents the system function with respect to the vertical direction on the image. All of the low-pass filters have the same characteristics. The all-pass filters in the respective stages have characteristics different from one another.

Figure 7A:
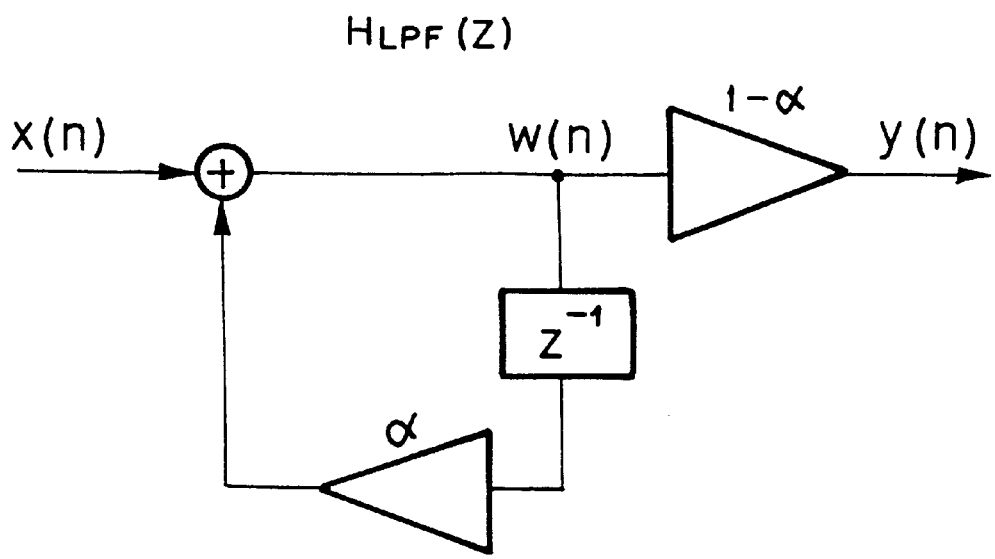
FIG. 7A is a circuit diagram showing a fundamental constitution of a low-pass type of IIR filter.
Figure 7B:
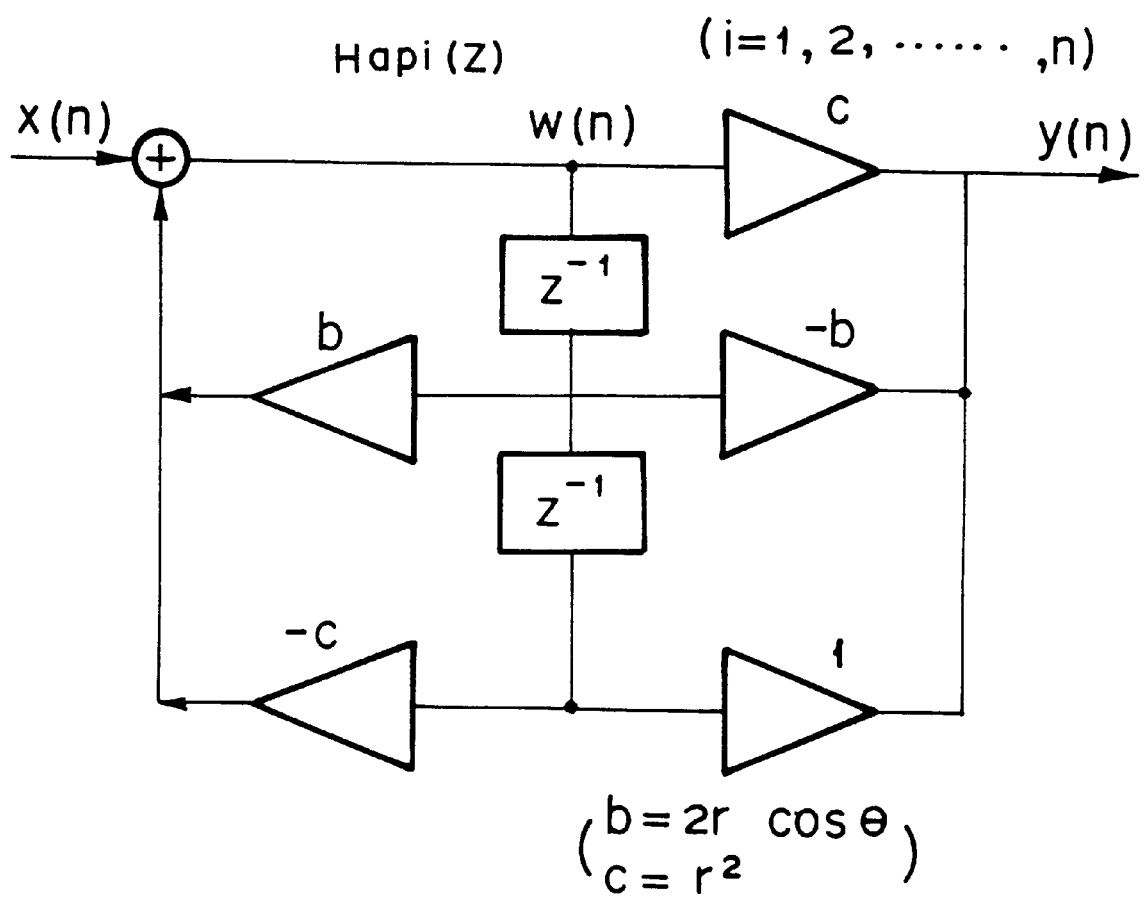
FIG. 7B is a circuit diagram showing a fundamental constitution of an all-pass type of IIR filter.
Figure 8B:
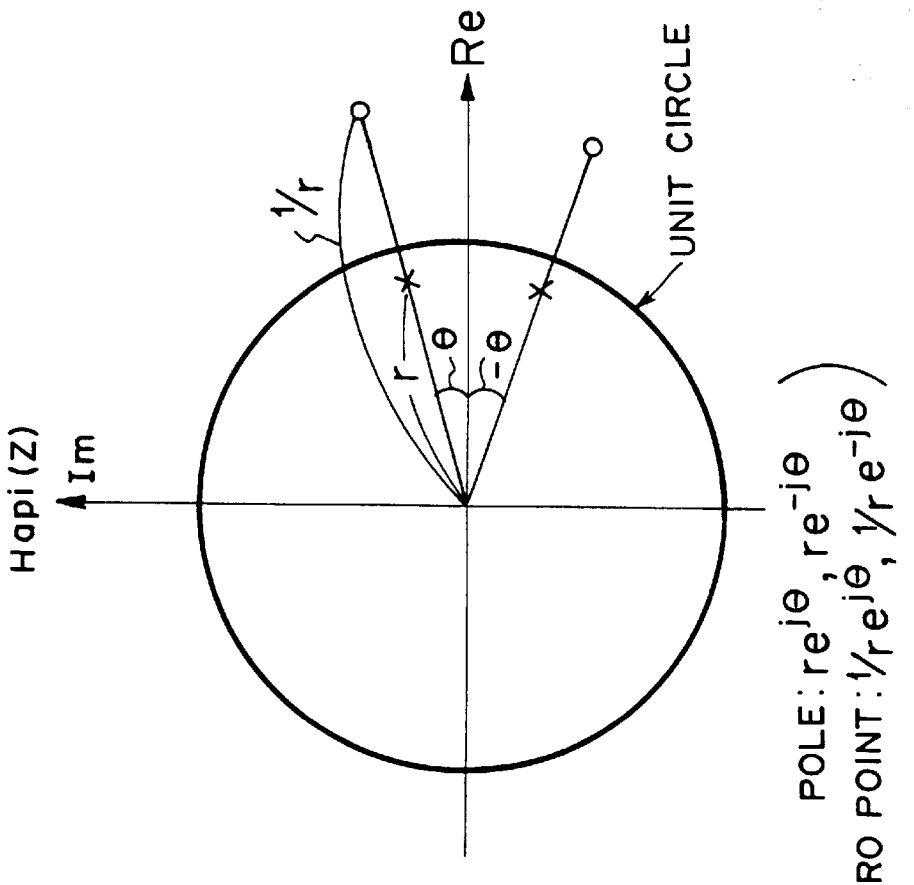
FIG. 8B is an explanatory view showing characteristics of the all-pass type of IIR filter.
Figure 8A:
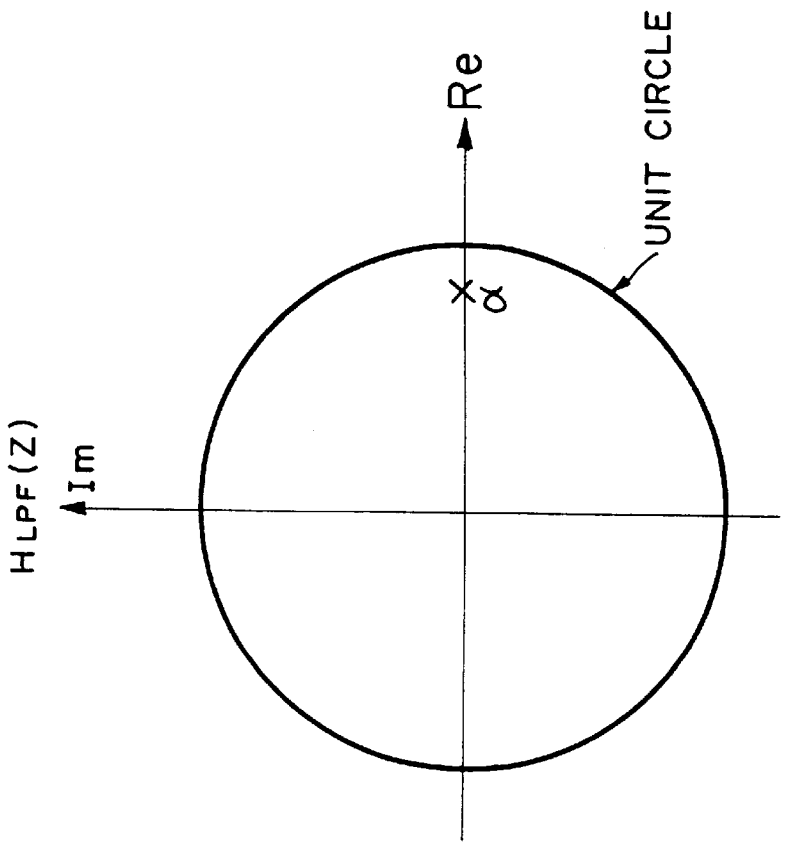
FIG. 8A is an explanatory view showing characteristics of the low-pass type of IIR filter.

FIG. 7A is a circuit diagram showing a fundamental constitution of the IIR type of the low-pass filter. FIG. 7B is a circuit diagram showing a fundamental constitution of the IIR type of the all-pass filter. As illustrated in FIG. 7A, the IIR type of the low-pass filter comprises a divider, which is located in the forward direction, and a delay circuit, which is located in the feedback direction. As illustrated in FIG. 7B, the IIR type of the all-pass filter comprises two delay circuits. Of the characteristics of the IIR type of the low-pass filter shown in FIG. 7A, the location of the zero and the pole is illustrated in FIG. 8A. Also, of the characteristics of the IIR type of the all-pass filter shown in FIG. 7B, the location of the zero and the pole is illustrated in FIG. 8B. The low-pass filter has the characteristics such that, as the filter factor α becomes close to 1, the cut-off frequency shifts to the low-frequency side. On the other hand, the amplitude characteristics of the all-pass filter are equal to 1.0 at every frequency, and the all-pass filter has only the phase characteristics. The phase characteristics are determined by the location of the pole and the zero.

How the filters in the LPF 18 are designed will be described hereinbelow. Firstly, the characteristics of the low-pass filters $H_{LPF}$ are optimized such that the use of the amplitude characteristics of the low-pass filters may be satisfied. Specifically, the value of the filter factor α in FIGS. 7A and 8A and the value of m are optimized. Thereafter, the number n of stages of the all-pass filters and the location of the pole and the zero in each stage of the all-pass filter are optimized such that the total group delay characteristics of the low-pass filters and the all-pass filters may become flat.

Figure 9:
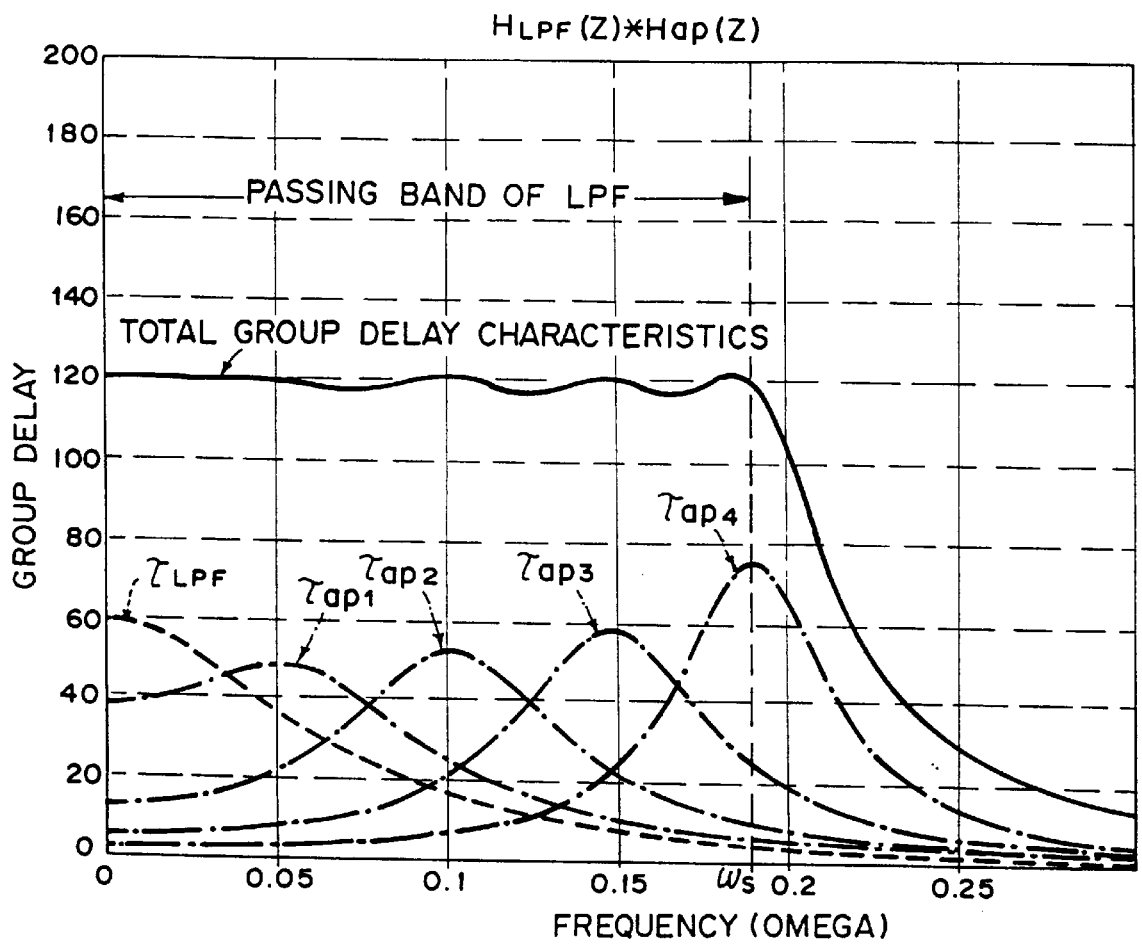
FIG. 9 is a graph showing group delay characteristics of an IIR filter.

FIG. 9 shows the group delay characteristics, which are obtained by carrying out the optimization in the manner described above. As illustrated in FIG. 9, though slight ripples remain in the total group delay characteristics, the total group delay characteristics which are practically acceptable can be obtained. In FIG. 9, the number n of stages of the all-pass filters is equal to 4. If the number n of stages of the all-pass filters is small, the problems will occur in that the ripples become large, and the image quality cannot be kept good. If the number n of stages of the all-pass filters is large, the ripples will reduce, but the scale of the apparatus cannot be kept small. Therefore, the number n of stages of the all-pass filters should preferably fall within the range of 3 to 6.

Figure 10A:
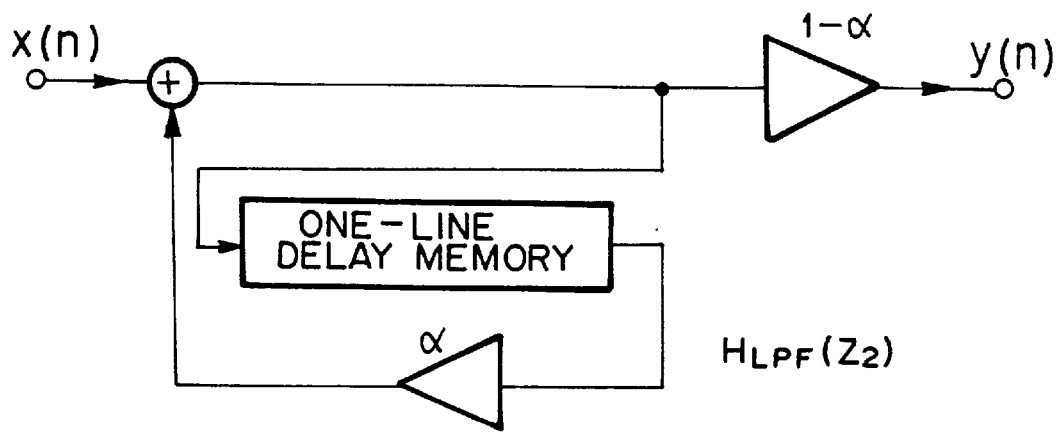
FIG. 10A is a circuit diagram showing an example of a constitution of a low-pass type of IIR filter.
Figure 10B:
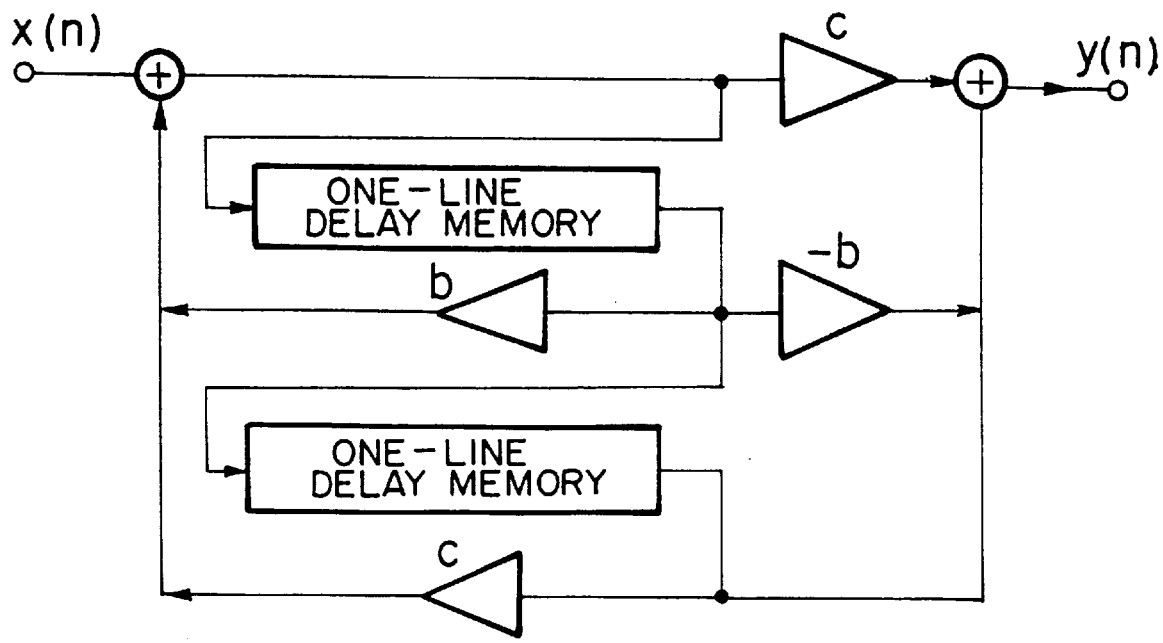
FIG. 10B is a circuit diagram showing an example of a constitution of an all-pass type of IIR filter.

FIG. 10A is a circuit diagram showing an example of the constitution of the IIR type of the low-pass filter for carrying out the filtering process with respect to the vertical direction in the image in the LPF 18. FIG. 10B is a circuit diagram showing an example of the constitution of the IIR type of the all-pass filter for carrying out the filtering process with respect to the vertical direction in the image in the LPF 18. As illustrated in FIG. 10A, the low-pass filter $H_{LPF}$ (z2) contains a single one-line delay memory. Also, as illustrated in FIG. 10B, the all-pass filter $H_{api}$(z2) contains two one-line delay memories. Therefore, in cases where the low-pass filters $H_{LPF}$ are located in m number of stages and the all-pass filters $H_{api}$ are located in n number of stages, the number of the one-line delay memories becomes equal to m+2n. For example, in cases where m=2 and n=4, the number of the one-line delay memories becomes equal to 10. Accordingly, the number of the delay memories can be kept markedly smaller and the scale of the apparatus can be kept smaller than when the same processing is carried out with FIR filters.

How the first embodiment of the image reproducing apparatus in accordance with the present invention operates will be described hereinbelow.

Firstly, the light is produced by the light source 2 of the image read-out section 1A. The light is converted to a predetermined amount of light by the light regulating means 3. By way of example, the amount of light, which has passed through the minimum image density point in the image having been recorded on the film 6, is measured previously, and the light regulating means 3 adjusts the amount of light having been produced by the light source 2 such that the amount of light, which has passed through the minimum image density point in the image, may be slightly lower than the saturation level of the CCD image sensor 8. The light having been adjusted by the light regulating means 3 passes through the RGB filter 4, is diffused by the mirror box 5, and then impinges upon the film 6. The light passes through the film 6 and is thus modulated in accordance with the image information having been recorded on the film 6. Thereafter, the light passes through the lens 7 and impinges upon the CCD image sensor 8. In this manner, the light is photoelectrically converted by the CCD image sensor 8 into an image signal, which represents the image having been recorded on the film 6. In this embodiment, firstly, in order for the preliminary read-out image signals $S_P$ to be obtained, the detection intervals of the CCD image sensor 8 are set to be comparatively coarse. The RGB filter 4 is changed over to R, G, and B, and three color preliminary read-out image signals $S_P$ representing the color image are thereby obtained. The three color preliminary read-out image signals $S_P$ are fed into the image processing section 1B. At the image processing section 1B, the processing is carried out in the manner described below.

The preliminary read-out image signals $S_P$ obtained at the image read-out section 1A are weak, and are therefore amplified by the amplifier 10. The image signals are then converted into the digital preliminary read-out image signals $S_P$ by the analog-to-digital converter 11. The digital preliminary read-out image signals $S_P$ are converted into image density signals by the LUT 12 and are then respectively stored in the frame memories 14R, 14G, and 14B.

Thereafter, the preliminary read-out image signals $S_P$ are read from the frame memories 14R, 14G, and 14B and are fed into the automatic set-up algorithm means 27 and the LUT 23. In the automatic set-up algorithm means 27, the processing described below is carried out.

Figure 11:
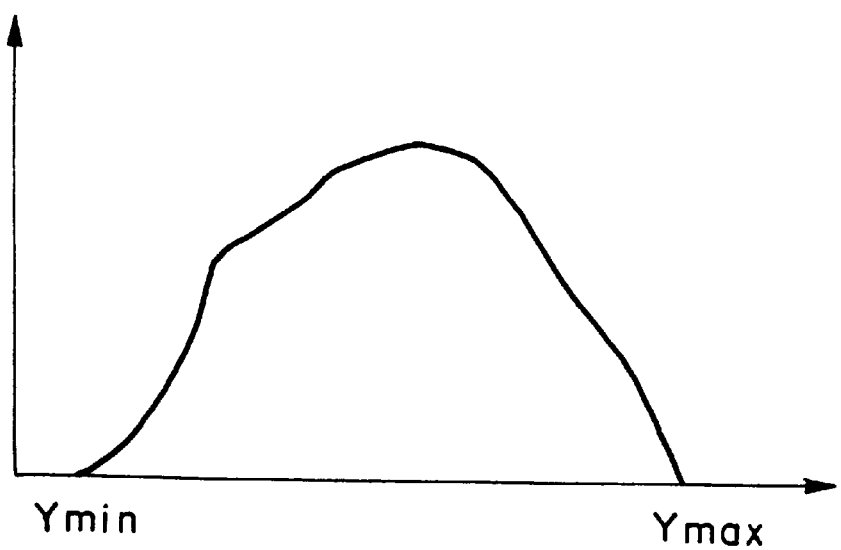
FIG. 11 is a graph showing a histogram of an image signal.

Firstly, the histogram of the preliminary read-out image signals $S_P$ is calculated. FIG. 11 shows the histogram of the preliminary read-out image signals $S_P$. From the histogram shown in FIG. 11, the maximum luminance Ymax and the minimum luminance Ymin from the R, G, and B colors are calculated. In accordance with the maximum luminance Ymax and the minimum luminance Ymin, the gray balance adjustment table shown in FIG. 2A, which is to be utilized in the LUT 15, is set.

Also, in accordance with the histogram, the dynamic range compression tables for the dynamic range compressing process, which is carried out in the LUT 19, are set. The dynamic range compression tables are set in the manner described below.

The image signal and the ultimate print density are related to each other in the manner described below. Specifically, in the gradation curve of the LUT 21 representing the relationship between the signal value and the print density, the region, in which the object image pattern can be reproduced such that the details of the object image pattern may not become imperceptible due to insufficient gradation, is the region G shown in FIG. 4. Therefore, in the digital image signal, if the object image pattern contained in the image is outside the range G, an image portion, such as a catch light portion, in which the signal value is large, will become white and its details will become imperceptible. Also, an image portion, in which the signal value is small, will become black and its details will become imperceptible. Thus the gray level of the portions of the image cannot be reproduced appropriately. Accordingly, in this embodiment, the rates of dynamic range compression are set in the manner described below such that the details of the very bright portion and the details of the very dark portion may not become imperceptible due to insufficient gradation in the print formed on the photosensitive material.

Firstly, the rates of dynamic range compression are set in accordance with the dynamic range having been calculated from the histogram shown in FIG. 11. Specifically, the rates of dynamic range compression are set such that the dynamic range, i.e. the difference between the maximum luminance Ymax and the minimum luminance Ymin of the preliminary read-out image signals $S_P$ having been calculated from the histogram shown in FIG. 11, may become identical with the signal of the range G between Ymax' and Ymin' of the LUT 21 shown in FIG. 4. More specifically, if the dynamic range of the image signal is larger than the range G between Ymax' and Ymin', since the value of the gradation curve γ corresponding to the region of the image signal, in which the signal value is larger than Ymax' (and which represents the highlight), converges, the details of the highlight will become imperceptible due to insufficient gradation in the reproduced image. Also, since the value of the gradation curve γ corresponding to the region of the image signal, in which the signal value is smaller than Ymin' (and which represents the shadow), converges, the details of the shadow will become imperceptible due to insufficient gradation in the reproduced image. Therefore, the rate of dynamic range compression $\alpha_1$ for the highlight and the rate of dynamic range compression $\alpha_d$ are set such that the details of the highlight and the shadow may not become imperceptible. Specifically, the rate of dynamic range compression $\alpha_1$ is set such that the signal in the vicinity of the maximum luminance Ymax of the preliminary read-out image signals $S_P$ may be compressed to the level not higher than Ymax'. Also, the rate of dynamic range compression $\alpha_d$ is set such that the signal in the vicinity of the minimum luminance Ymin of the preliminary read-out image signals $S_P$ may be compressed to the level not lower than Ymin'.

Figure 12:
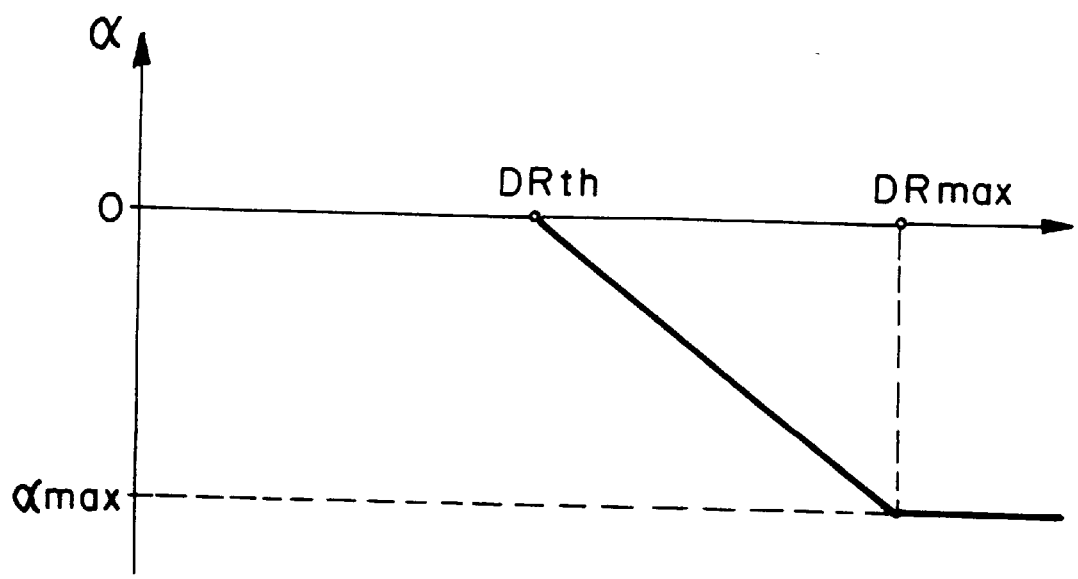
FIG. 12 is a graph showing the relationship between a dynamic range and a rate of dynamic range compression.

Further, the rate of dynamic range compression α for the entire area of the image is set with the function α(DR) shown in FIG. 12, wherein DR is an acronym for the dynamic range. The function α(DR) has the characteristics such that, in cases where the dynamic range of the image signal is smaller than a threshold value DRth, the rate of compression may be equal to zero, i.e. the dynamic range compressing process may not be carried out. This is because, in cases where the dynamic range is small and the low frequency contrast of the image is low, if the dynamic range compressing process is carried out, the low frequency contrast of the image will become low even further, and the reproduced image will become imperceptible. As for the image pattern of a highlight, such as a catch light portion, which is embedded in an image, instead of the gradation being formed with the dynamic range compressing process, the minimum image density should preferably be not reproduced in the reproduced image. Therefore, in FIG. 12, in cases where the dynamic range is larger than DRmax, α is clipped at the lower limit value α max.

Thereafter, the tables for the dynamic range compressing process carried out in the LUT 19 are set. Firstly, the dynamic range compression table for the entire area of the image is set in accordance with the rate of compression α having been set with the function shown in FIG. 12. As illustrated in FIG. 3A, the dynamic range compression table for the entire area of the image is represented by the monotonously decreasing function in which the image signal serves as the variable. The function f(α) representing the dynamic range compression table is set by the inclination α around a signal value YO. By way of example, in cases where the object is a person and the pattern of the person is embedded in the color image, a value, which falls within the range of 0.50 to 0.70 and corresponds to approximately the same image density as the flesh color, preferably a value of 0.6, is set as the signal value YO. In cases where the signal value YO is thus set, the dynamic range compression does not affect the brightness correction with respect to the aforesaid image density, and therefore the function for the brightness correction and the function for the dynamic range compressing process can be clearly separated from each other. As a result, the setting of parameters in the automatic set-up algorithm means 27 becomes easy. Also, the advantage can be obtained in that, in cases where the brightness of the primary image portion could not be adjusted appropriately with the brightness adjusting process, the dynamic range compressing process serves such that the primary image portion may be set to be a value close to YO.

Figure 3B:
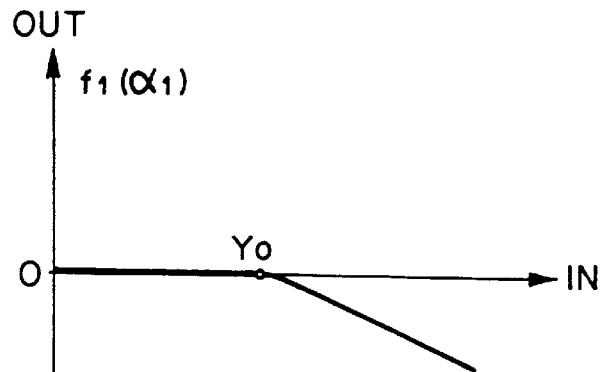
Figure 3C:
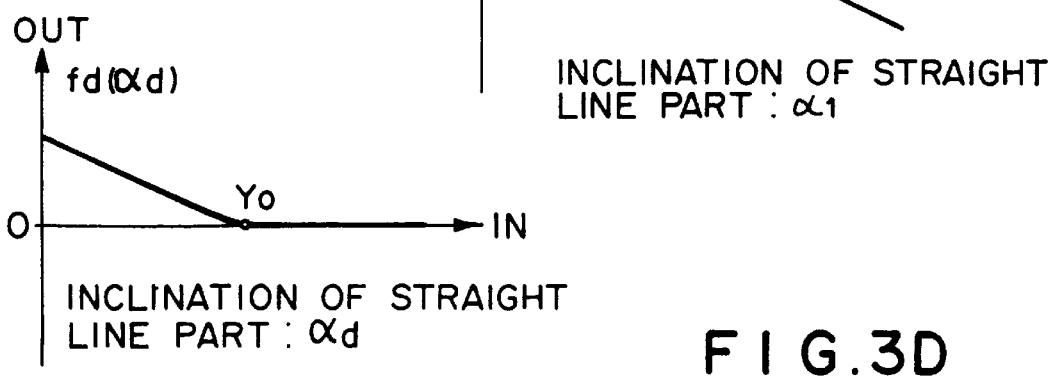
Figure 4:
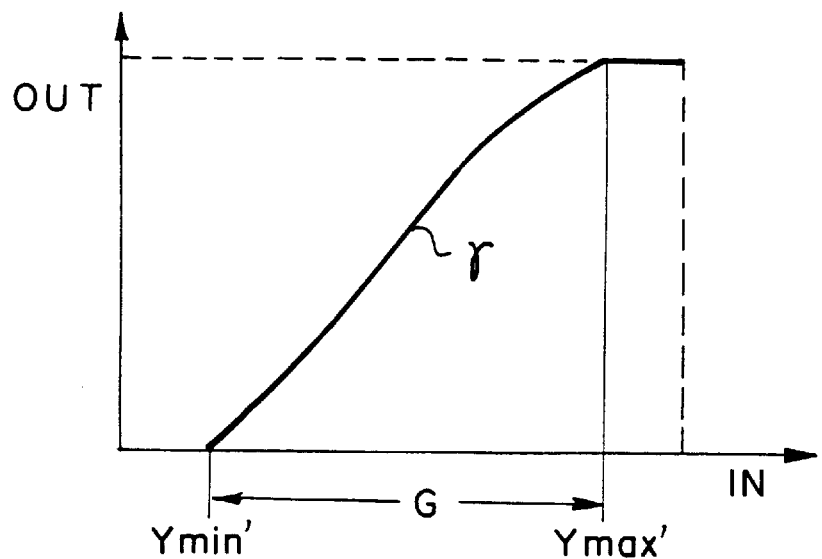
FIG. 4 is a graph showing a table for gradation conversion carried out in an LUT 21.

Also, as illustrated in FIG. 3B, a function $f_1(\alpha_1)$ representing the dynamic range compression table for the portion, in which the image signal value is large, i.e. the bright portion, is set. Further, as illustrated in FIG. 3C, a function $f_d(\alpha_d)$ representing the dynamic range compression table for the portion, in which the image signal value is small, i.e. the dark portion, is set. These functions are determined respectively by the rates of dynamic range compression $\alpha_1$ and $\alpha_d$, which have been set in the manner described above.

The functions $f(\alpha)$, $f_1(\alpha_1)$, and $f_d(\alpha_d)$ are added together, and a function $f_t(\alpha)$ representing an ultimate dynamic range compression table, which is to be used in the LUT 19, is thereby set. The calculation is carried out with Formula (3) shown below.

$$f_t(\alpha)=f(\alpha)+f_1(\alpha_1)+f_d(\alpha_d) \tag{3}$$

Figure 3D:
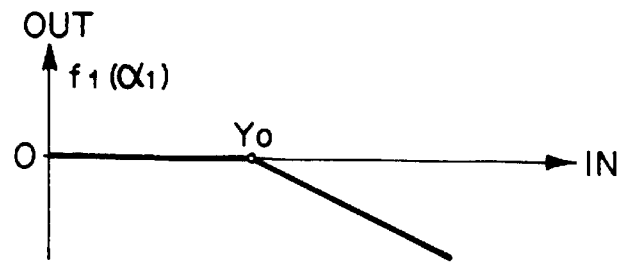
Figure 3E:
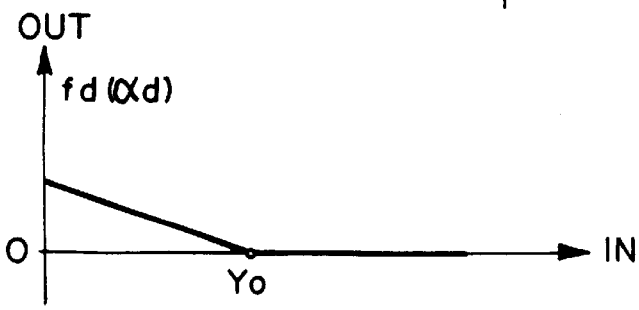

In cases where $f_1(\alpha_1)$ and $f_d(\alpha_d)$ are the functions shown in FIGS. 3D and 3E, which are discontinuous at the point YO, even if no contour is embedded in the original image, an artifact will often occur in the image density region corresponding to the point YO in the processed image. In cases where the functions $f_1(\alpha_1)$ and $f_d(\alpha_d)$ are set as shown in FIGS. 3B and 3C such that the differential coefficient may be continuous at the point YO, such an artifact can be prevented from occurring.

The functions $f_1(\alpha_1)$ and $f_d(\alpha_d)$ are the straight lines having an end point at YO. Such that the occurrence of an artifact may be restricted, they should preferably be set as shown in FIGS. 3B and 3C such that the differential coefficient may be continuous.

Figure 5:
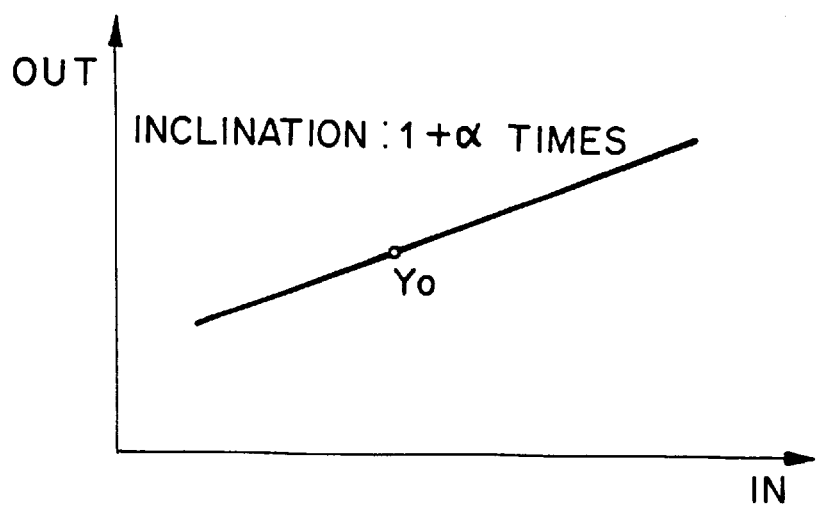
FIG. 5 is a graph showing a table for gradation conversion carried out in an LUT 23.

The rates of dynamic range compression are set in the manner described above. The dynamic range compressing process is then carried out on the preliminary read-out image signals $S_P$ by using the rates of dynamic range compression. The preliminary read-out image signals $S_P$, which have been obtained from the dynamic range compressing process, are then fed into the LUT 23. The preliminary read-out image signals $S_P$ are subjected to the gradation processing in the LUT 23, converted into analog signals by the digital-to-analog converter 24, and then used for reproducing a visible image on the monitor 25. The visible image, which is displayed on the monitor 25, is the image reproduced from the preliminary read-out image signals $S_P$. It is necessary for the effects of the dynamic range compression to be reflected on the displayed image. However, if the dynamic range compressing process is carried out on the preliminary read-out image signals $S_P$, the problems will occur in that the scale of the image reproducing system cannot be kept small. In order for the effects of the rates of dynamic range compression to be confirmed, it is only necessary that the gradation conversion be carried out on the preliminary read-out image signals $S_P$ by using a simple gradation conversion table shown in FIG. 5, in which a rate of dynamic range compression α+1 is set as the inclination, and that a visible image be reproduced from the preliminary read-out image signals $S_P$ having been obtained from the gradation conversion and displayed on the monitor 25. Therefore, the information representing the gradation conversion table shown in FIG. 5 is stored in the LUT 23. Instead of the dynamic range compressing process being carried out on the preliminary read-out image signals $S_P$, the gradation conversion is carried out on them by using the gradation conversion table stored in the LUT 23. A visible image is then reproduced from the resulting signals and displayed on the monitor 25. In this manner, confirmation of the effects of the rates of dynamic range compression can be carried out such that the scale of the image reproducing system may not become large.

Figure 13:
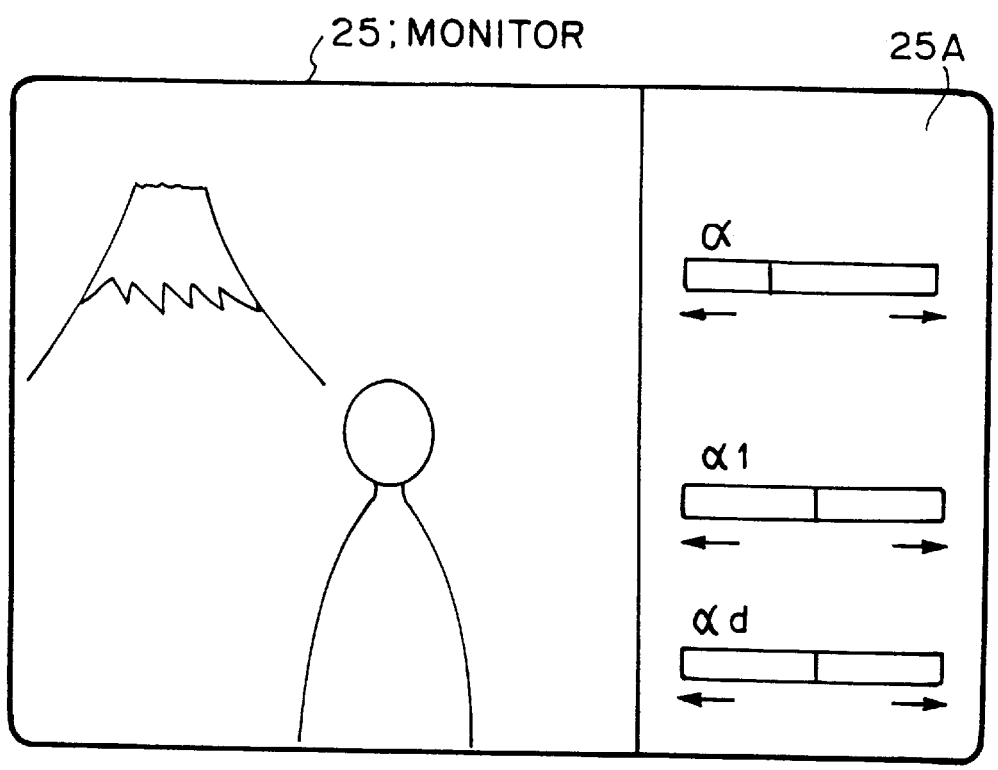
FIG. 13 is a schematic view showing an image displayed on a monitor.

FIG. 13 shows how the visible image represented by the preliminary read-out image signals $S_P$ is displayed on the monitor 25. An adjustment section 25A, in which the rates of compression of the displayed image are adjusted with the mouse device 26, is displayed on the monitor 25. The rates of compression are adjusted by operating the mouse device 26, and the scene of the image represented by the preliminary read-out image signals $S_P$ is discriminated. The rates of dynamic range compression are thereby adjusted finely. The information representing the rates of dynamic range compression having thus been adjusted is fed into the automatic set-up algorithm means 27, and the dynamic range compression tables to be used in the LUT 19 are thereby set ultimately.

In this embodiment, the operator views the image displayed on the monitor 25 and adjusts the rates of compression having been set by the automatic set-up algorithm means 27. Alternatively, the automatic set-up algorithm means 27 may be constituted such that it may discriminates the scene of the image and may automatically adjust the rates of dynamic range compression.

After the setting of the LUT 15, the LUT 19, and the LUT 21 has thus been carried out by the automatic set-up algorithm means 27, the final read-out operation is carried out in the manner described below.

Firstly, the light is produced by the light source 2 of the image read-out section 1A. The light is converted to a predetermined amount of light by the light regulating means 3. In the final read-out operation, the amount of light adjusted by the light regulating means 3 is set in accordance with the values of the preliminary read-out image signals $S_P$ having been stored in the frame memories 14R, 14G, and 14B. The light having been adjusted by the light regulating means 3 passes through the RGB filter 4, is diffused by the mirror box 5, and then impinges upon the film 6. The light passes through the film 6 and is thus modulated in accordance with the image information having been recorded on the film 6. Thereafter, the light passes through the lens 7 and impinges upon the CCD image sensor 8. In this manner, the light is photoelectrically converted by the CCD image sensor 8 into an image signal, which represents the image having been recorded on the film 6. In this case, in order for the final read-out image signals $S_Q$ to be obtained, the detection intervals of the CCD image sensor 8 are set to be comparatively fine. The RGB filter 4 is changed over to R, G, and B, and three color final read-out image signals $S_Q$ representing the color image are thereby obtained. The three color final read-out image signals $S_Q$ are fed into the image processing section 1B. At the image processing section 1B, the processing is carried out in the manner described below.

The final read-out image signals $S_Q$ obtained at the image read-out section 1A are weak, and are therefore amplified by the amplifier 10. The image signals are then converted into the digital final read-out image signals $S_Q$ by the analog-to-digital converter 11. The digital final read-out image signals $S_Q$ are converted into image density signals by the LUT 12 and are then respectively stored in the frame memories 13R, 13G, and 13B.

Thereafter, the final read-out image signals $S_Q$ are read from the frame memories 13R, 13G, and 13B and fed into the LUT 15. In the LUT 15, the correction of the gray balance, the correction of the brightness, and the correction of the gradation are carried out on the final read-out image signals $S_Q$ in accordance with the gray balance adjustment table shown in FIG. 2A, the brightness correction table shown in FIG. 2B, and the gradation correction table shown in FIG. 2C, which have been determined by the automatic set-up algorithm means 27. The final read-out image signals $S_Q$ having thus been corrected by the LUT 15 are fed into the MTX 16 and subjected to color correction. As described above, the MTX 16 corrects the digital image signals such that the colors may be reproduced by the combination of the spectral characteristics of the film 6 and the spectral characteristics of the photosensitive material, on which the visible image is reproduced ultimately. The final read-out image signals $S_Q$ having been obtained from the color correction carried out by the MTX 16 are fed into the addition means 20 and the MTX 17. In the MTX 17, the luminance is formed from the R, G, and B signals. Specifically, the R, G, and B color image signals are converted into the luminance by using a value of one-third of the mean value of each color image signal or by using the YIQ base, or the like. For example, in cases where the luminance is to be formed with the YIQ base, only the Y components of the YIQ base are calculated from the R, G, and B signal values. The calculation is carried out with Formula (4) shown below.

$$Y=0.3R+0.59G+0.11B \qquad (4)$$

The luminance signal, which has thus been obtained, is then converted into the unsharp image signal by the LPF 18. The unsharp image signal is then fed into the LUT 19. In the LUT 19, the dynamic range compressing process is carried out in accordance with the function $f_r(\alpha)$ for the dynamic range compression, which has been set by the automatic set-up algorithm means 27. The unsharp image signal, which has been obtained from the dynamic range compressing process, is fed into the addition means 20. In the addition means 20, the unsharp image signal and the final read-out image signals $S_Q$, which have been obtained from the color correction carried out by the MTX 16, are added together, and the addition signals Sadd are thereby obtained. In the addition signals Sadd, the dynamic range of the low frequency components of the image has been compressed. The addition signals Sadd having thus been obtained are fed into the LUT 21. In the LUT 21, the gradation processing is carried out in accordance with the ultimate output medium, such as a photosensitive material. The processed image signals are obtained in this manner.

Figure 14:
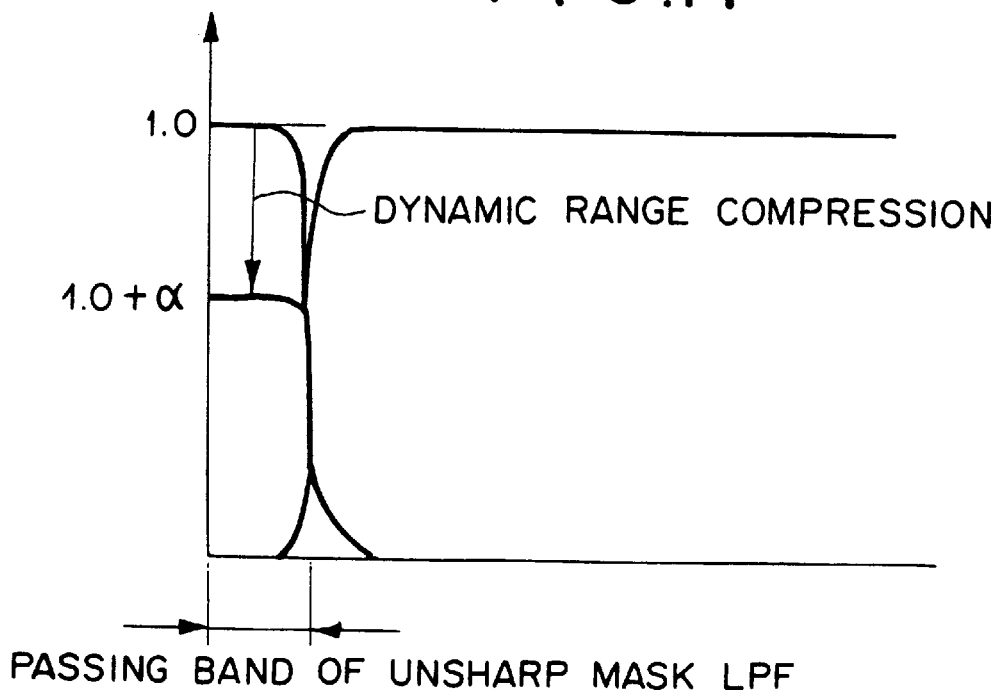
FIG. 14 is a graph showing the frequency characteristics of a processed image signal.

FIG. 14 shows the frequency characteristics of the processed image signals. As illustrated in FIG. 14, the passing band of the LPF 18 corresponds to the low frequency contrast. The high frequency contrast corresponds to the components of higher frequency than the passing band of the LPF 18, and therefore is not subjected to the compression with the LUT 19. Therefore, the image reproduced from the processed image signals can be obtained such that the dynamic range may have been compressed while the high frequency contrast is being kept. Thus the image processing, which corresponds to the shutting light technique in the analog surface exposure operation, can be carried out.

The processed image signals having thus been obtained from the LUT 21 are fed into the digital-to-analog converter 22 and converted into analog signals. The analog signals obtained from the digital-to-analog converter 22 are fed into an image-wise exposure section 98 shown in FIG. 15. At the image-wise exposure section 98, the processing described below is carried out.

The image signals having been obtained from the image processing section 1B are fed into acousto-optic modulator (AOM) drivers (not shown). The AOM drivers operate AOM's 104R, 104G, and 104B of the image-wise exposure section 98 such that light beams may be modulated in accordance with the received image signals.

Figure 15:
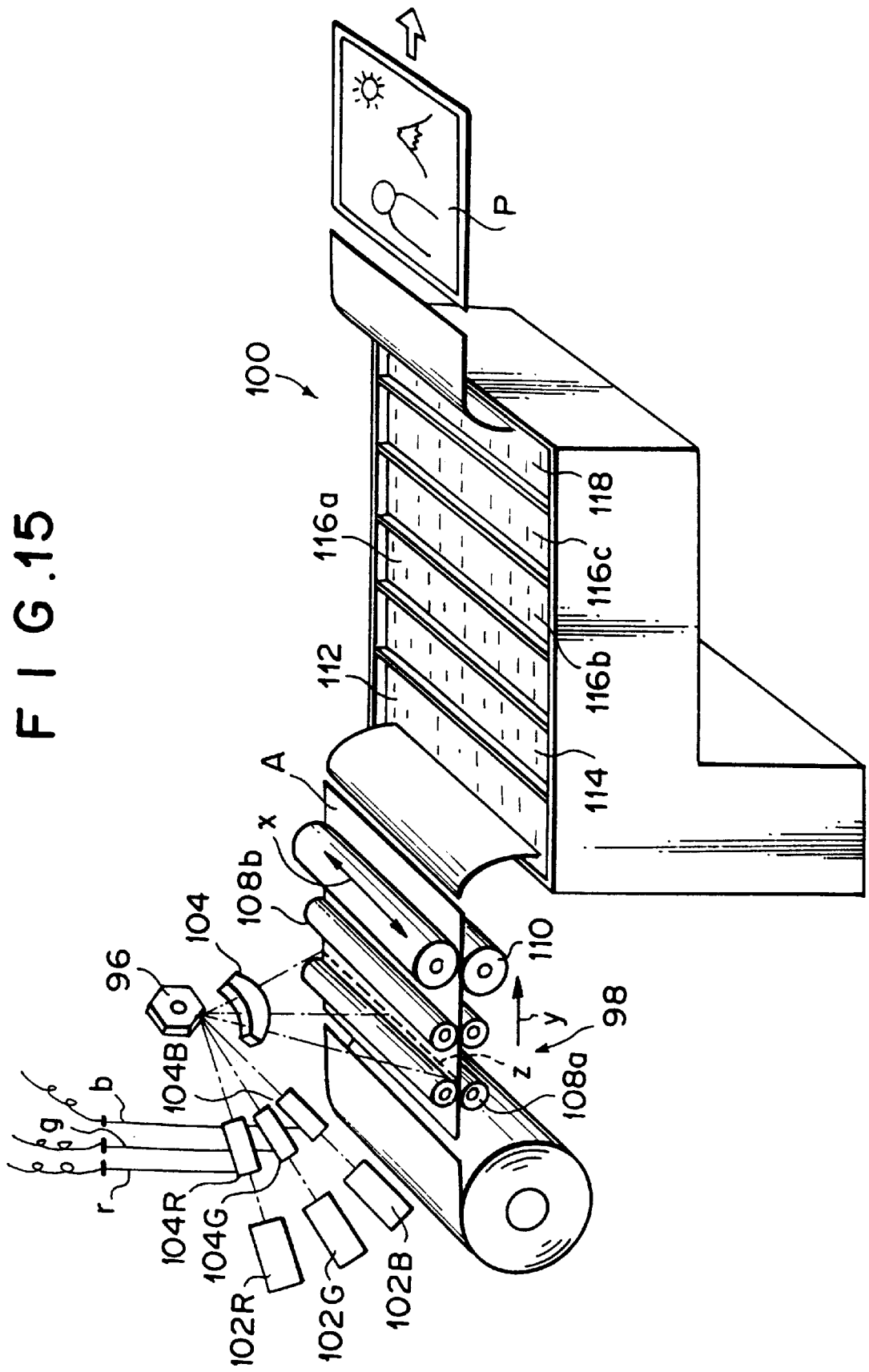
FIG. 15 is a perspective view showing a developing section.

At the image-wise exposure section 98, a photosensitive material A is scanned with and exposed to light with the light beam scanning (raster scanning) technique, and an image represented by the image signals is thereby reproduced on the photosensitive material A. As illustrated in FIG. 15, the image-wise exposure section 98 comprises a light source 102R for producing a light beam having wavelengths of a narrow-band range corresponding to the exposure of a red-sensitive layer of the photosensitive material A, a light source 102G for producing a light beam having wavelengths of a narrow-band range corresponding to the exposure of a green-sensitive layer of the photosensitive material A, and a light source 102B for producing a light beam having wavelengths of a narrow-band range corresponding to the exposure of a blue-sensitive layer of the photosensitive material A. The image-wise exposure section 98 also comprises the AOM's 104R, 104G, and 104B for respectively modulating the light beams, which have been produced by the light sources 102R, 102G, and 102B, in accordance with the recorded image information. The image-wise exposure section 98 further comprises a rotating polygon mirror 96 serving as a light deflector, an fθ lens 106, and a sub-scanning conveyance means 108 for conveying the photosensitive material A in a sub-scanning direction.

The light beams having been produced by the light sources 102R, 102G, and 102B travel along directions at different angles and impinge upon the corresponding AOM's 104R, 104G, and 104B. As the light sources 102R, 102G, and 102B, various types of light beam sources may be utilized, which are capable of producing the light beams having predetermined wavelengths corresponding to the sensitive layers of the photosensitive material A. For example, various types of semiconductor lasers, SHG lasers, or gas lasers, such as HeNe lasers, may be used. Alternatively, the light sources may be constituted as a light beam combining optical system. The AOM's 104R, 104G, and 104B receive drive signals r, g, and b, which are for red, green, and blue colors and correspond to the recorded image information, from the AOM drivers. The AOM's 104R, 104G, and 104B thus modulate the intensities of the light beams, which impinge thereupon, in accordance with the recorded image information.

The light beams having been modulated by the AOM's 104R, 104G, and 104B impinge upon the rotating polygon mirror 96 serving as the light deflector and are reflected from it. The light beams are thus deflected in main scanning directions, which are indicated by the double headed arrow x in FIG. 15. Thereafter, the light beams are regulated by the fθ lens 106 such that they may be imaged in a predetermined beam shape at a predetermined scanning position z. The light beams thus impinge upon the photosensitive material A. In lieu of the rotating polygon mirror, a resonant scanner, a galvanometer mirror, or the like, maybe utilized as the light deflector. Also, when necessary, the image-wise exposure section 98 may be provided with a light beam shaping means and an optical system for compensation for inclinations of the surfaces of the light deflector.

A roll of the photosensitive material A is located at a predetermined position such that it maybe shielded from light. The photosensitive material A is delivered from the roll by a delivery means, such as delivery rollers, and is cut to a predetermined length by a cutter (not shown). The sub-scanning means 108 is constituted of a pair of rollers 108*a*, 108*a* and a pair of rollers 108*b*, 108*b*. The two pairs of rollers are located with the scanning position z intervening therebetween. The pair of rollers 108*a*, 108*a* and the pair of rollers 108*b*, 108*b* support the cut photosensitive material A at the scanning position z and convey it in the sub-scanning direction, which is approximately normal to the main scanning directions and is indicated by the arrow y in FIG. 15. As described above, the light beams are deflected in the main scanning directions. Therefore, the entire area of the photosensitive material A, which is being conveyed in the sub-scanning direction, is scanned with the light beams in the two-dimensional directions. In this manner, an image represented by the image signals, which have been processed by the LUT 21, is reproduced on the photosensitive material A.

The photosensitive material A, which has been exposed to the light beams, is then conveyed by a pair of conveying rollers 110, 110 into a developing section 100. At the developing section 100, the photosensitive material A is subjected to development processing, and a finished print P is thereby obtained. For example, in cases where the photosensitive material A is a silver halide photographic material, the developing section 100 is constituted of a color development tank 112, a bleach-fix tank 114, a washing tanks 116*a*, 116*b*, and 116*c*, and a drying means 118. The photosensitive material A is subjected to predetermined processing in the respective processing tanks, and the finished print P is thereby obtained.

In the embodiment of FIG. 15, the light beams are modulated by the AOM's 104R, 104G, and 104B. Alternatively, in cases where light sources, such as LD's, which are capable of undergoing direct modulation, are utilized, the light beams may be directly modulated in accordance with the recorded image information. Also, in lieu of the two pairs of rollers, which are located with the scanning position intervening therebetween, a combination of an exposure drum, which supports the photosensitive material at the scanning position, and two nipping rollers, which are located with the scanning position intervening therebetween, may be utilized as the sub-scanning conveyance means.

Further, in lieu of the light beam scanning described above, a drum scanner may be utilized. In cases where the drum scanner is employed, the photosensitive material is wound around a drum, and the light beams are caused to impinge upon a single point on the photosensitive material. Also, the drum is rotated and, at the same time, is moved along the axis of the drum. As another alternative, a surface exposure operation using a surface light source and a liquid crystal shutter may be employed. As a further alternative, the exposure operation may be carried out by using a linear light source, such as an LED array. Furthermore, in the embodiment of FIG. 15, the photosensitive material is cut into a sheet before being exposed to the light beams. Alternatively, the photosensitive material may be exposed to the light beams without being cut into sheets, and may be cut into sheets before being processed at the developing section 100 or after being processed at the developing section 100.

In the manner described above, the visible image is reproduced at the developing section 100. Even if the visible image is the one reproduced from a backlighted scene, the details of the pattern of the person will not become imperceptible due to insufficient gradation in the visible image. Also, the details of the bright background pattern will not become imperceptible. Further, even if the visible image is the one reproduced from an image having been recorded by using an electronic flash, a visible reproduced image can be obtained such that both the details of a pattern of a person, which is located on the foreground side in the image, and the details of a background, which is located far away behind the pattern of the person, may be prevented from becoming imperceptible due to insufficient gradation. In this manner, an image having been subjected to the appropriate dynamic range compressing process can be obtained.

In cases where a shutting light technique is carried out by controlling the distribution of the luminance of an illuminating light source, the selection of the factor of the MTX 17 is the only possible method for controlling the color reproducibility. Therefore, in cases where the color reproducibility is adjusted, both the brightness and the color reproducibility changes simultaneously at an edge in the image, and a print having an unnatural feeling is obtained. However, in the embodiment of the image reproducing apparatus in accordance with the present invention, the MTX 17 is constituted in order to convert the color image signals into the luminance. Therefore, with the embodiment of the image reproducing apparatus in accordance with the present invention, even though the brightness of an edge of an object changes, the color reproducibility at the edge does not change. Accordingly, a print having a natural feeling can be obtained.

Further, the LUT 21 has the nonlinear characteristics. Therefore, the gradation correction can be carried out also for the portions of nonlinear characteristics on the original image film (e.g., an over-exposure portion and an under-exposure portion).

Furthermore, in cases where a processing means for sharpness emphasis is added to the image reproducing apparatus, the high frequency contrast of the image can be emphasized.

In the aforesaid embodiment of the image reproducing apparatus in accordance with the present invention, the preliminary read-out operation is carried out in order to obtain the preliminary read-out image signals $S_P$, and the tables in the LUT 15, the LUT 19, and the LUT 21 are set by the automatic set-up algorithm means 27 in accordance with the preliminary read-out image signals $S_P$. Alternatively, the preliminary read-out operation may not be carried out, and the signals corresponding to the final read-out image signals $S_Q$ in the aforesaid embodiment may be obtained with a single read-out operation. In accordance with the signals obtained from the single read-out operation, the tables in the LUT 15, the LUT 19, and the LUT 21 may be set by the automatic set-up algorithm means 27. In this manner, instead of the preliminary read-out operation being carried out, the processing of the image signals can be carried out by carrying out only a single operation for reading out the image from the film 6. Therefore, the image processing can be carried out quickly. Also, since it is sufficient for a single image read-out operation to be carried out, it is not necessary for the film to be moved between the scanning operation and the exposure operation as in the apparatuses described in Japanese Unexamined Patent Publication Nos. 58(1983)-66929 and 64(1989)-35542 and Japanese Patent Publication No. 64(1989)-10819. Accordingly, no deviation occurs between the image signals and the mask signals due to an error occurring in the movement distance, and a reproduced image having good quality can be obtained reliably.

A second embodiment of the image reproducing apparatus in accordance with the present invention will be described hereinbelow. The second embodiment is the same as the first embodiment described above, except for the constitution of the LPF 18 shown in FIG. 1. Therefore, only the constitution of the LPF 18 in the second embodiment will be described hereinbelow.

Figure 16:
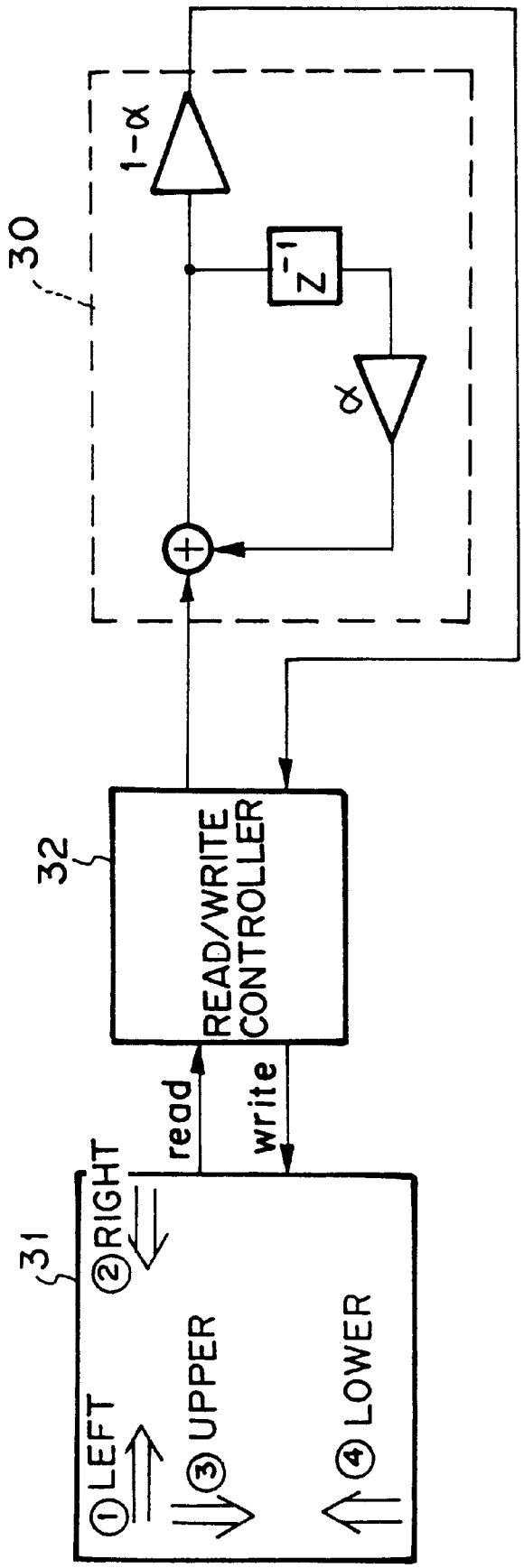
FIG. 16 is a block diagram showing a constitution of an LPF in a second embodiment of the image reproducing apparatus in accordance with the present invention.

FIG. 16 is a block diagram showing the constitution of the LPF 18 in the second embodiment of the image reproducing apparatus in accordance with the present invention. As illustrated in FIG. 16, in the second embodiment, the LPF 18 comprises a first-order, IIR type of low-pass filter 30, a frame memory 31 for storing the signal before being processed with the filter 30 and the signal after being processed with the filter 30, and a read/write controller (hereinbelow referred to as the controller) 32 for controlling the reading of the signal from the frame memory 31 and the writing of the signal into the frame memory 31.

In cases where the impulse response of the IIR filter is represented by h(n), and the frequency characteristics of the impulse response h(n) are represented by $H(e^{jw})$, Formula (5) shown below obtains.

$$h(n) \longleftrightarrow H(e^{jw}) = |H(e^{jw})| e^{j\theta(w)} \qquad (5)$$

In such cases, ordinarily, the phase characteristics θ(w) are not of the linear phase.

When the frequency characteristics of the impulse response h(-n), which is obtained by re-arranging the impulse response h(n) in the reverse direction, is analyzed, Formula (6) shown below obtains.

$$h(-n) \longleftrightarrow H(e^{jw}) = |H(e^{jw})| e^{-j\theta(w)} \qquad (6)$$

In cases where the systems having the impulse responses h(n) and h(-n) are connected with each other in a cascade arrangement, the frequency characteristics of the resulting system always become of the zero phase as represented by Formula (7) shown below. In Formula (7), * represents the convolution operation.

$$h(n) * h(-n) \longleftrightarrow |H(e^{jw})|^2 \qquad (7)$$

As described above, when the filtering process with a certain IIR type of low-pass filter is carried out twice, the phase component becomes equal to zero, and no phase distortion occurs in the signal. For example, the first filtering process may be carried out such that it may proceed from the left side toward the right side of the image, and the second filtering process may be carried out such that it may proceed from the right side toward the left side of the image.

As illustrated in FIG. 16, as for a two-dimensional signal as in an image signal, the filtering process may be carried out so as to proceed forward and backward with respect to each of the horizontal and vertical directions on the image. In this manner, the filtering process may be carried out four total times.

The filtering process is carried out in the manner described below. Firstly, the image signal S is fed into the frame memory 31. Thereafter, the controller 32 reads the image signal S from the frame memory 31 and feeds it into the filter 30. At this time, the reading of the image signal S is carried out so as to proceed from the left side toward the right side of the original image, and the image signal S is fed in this order into the filter 30. In the filter 30, the filtering process is carried out such that it may proceed from the left side toward the right side of the original image, and an image signal S1 is thereby obtained. The image signal S1, which has been obtained from the process proceeding from the left side toward the right side of the original image, is temporarily stored in the frame memory 31. Thereafter, the controller 32 reads the image signal S1 so as to proceed from the right side toward the left side of the original image, and feeds the image signal S1 in this order into the filter 30. In the filter 30, the filtering process is carried out such that it may proceed from the right side toward the left side of the original image, and an image signal S2 is thereby obtained. The image signal S2 having been obtained in this manner is fed into the frame memory 31. Thereafter, in the same manner as that described above, the controller 32 reads the image signal so as to proceed from the upper side toward the lower side of the original image, and the filter 30 carries out the filtering process such that it may proceed from the upper side toward the lower side of the original image. Also, the controller 32 reads the image signal so as to proceed from the lower side toward the upper side of the original image, and the filter 30 carries out the filtering process such that it may proceed from the lower side toward the upper side of the original image.

The filtering process is carried out with the IIR filter in the manner described above, and the unsharp image signal free from any phase distortion can be obtained. Thereafter, in the same manner as that in the first embodiment described above, the thus obtained unsharp image signal is subjected to the dynamic range compressing process. Also a processed image signal is obtained from the unsharp image signal having been obtained from the dynamic range compressing process and is used for reproducing a visible image on a photosensitive material at the developing section 100.

In the manner described above, the visible image is reproduced at the developing section 100. As in the first embodiment described above, even if the visible image is the one reproduced from a backlighted scene, the details of the pattern of the person will not become imperceptible due to insufficient gradation in the visible image. Also, the details of the bright background pattern will not become imperceptible. Further, even if the visible image is the one reproduced from an image having been recorded by using an electronic flash, a visible reproduced image can be obtained such that both the details of a pattern of a person, which is located on the foreground side in the image, and the details of a background, which is located far away behind the pattern of the person, may be prevented from becoming imperceptible due to insufficient gradation. In this manner, an image having been subjected to the appropriate dynamic range compressing process can be obtained.

Figure 17:
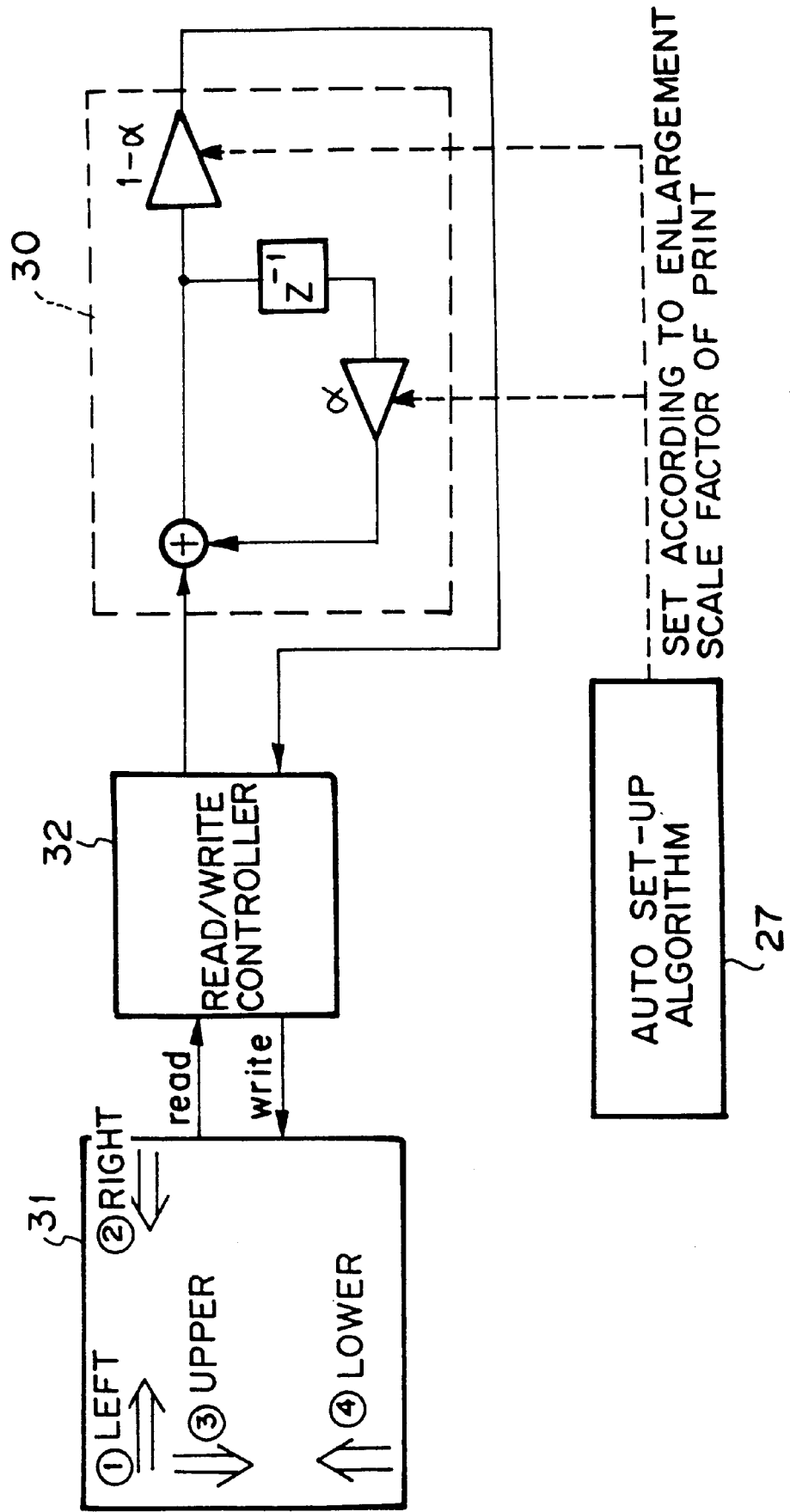
FIG. 17 is a block diagram showing a different constitution of an LPF in the second embodiment of the image reproducing apparatus in accordance with the present invention.

In the second embodiment, the IIR type of the low-pass filter has the fixed characteristics. However, the characteristics of the IIR type of the low-pass filter should preferably be variable in accordance with the enlargement scale factor of the ultimately obtained print. Specifically, the low-pass filter should preferably have the characteristics such that, as the enlargement scale factor of the print becomes large, the cut-off frequency of the low-pass filter may shift toward the low frequency side. The alteration of the characteristics of the low-pass filter may be carried out in the manner described below. For example, as illustrated in FIG. 17, the filter factor a of the filter 30 may be set to be variable by the automatic set-up algorithm means 27. Alternatively, as illustrated in FIG. 18, the number of times of the filtering processes may be set in accordance with the enlargement scale factor of the print. In cases where the number of times of the filtering processes is altered, the system function may be altered in the manner described below.

When the process is carried out a single time:

$$H(z1, z2)=|H(z1)|^2|H(z2)|^2$$

When the process is carried out two times:

$$H(z1, z2)=|H(z1)|^4|H(z2)|^4$$

When the process is carried out three times:

$$H(z1, z2)=|H(z1)|^6|H(z2)|^6$$

What is claimed is:

1. An image reproducing method, wherein a visible image is reproduced from a digital image signal representing a color image, the method comprising the steps of:

i) filtering the image signal with an IIR filter to form an unsharp image signal which represents an unsharp image of the color image;

ii) dynamic range compressing the image signal in accordance with said unsharp image signal to obtain a processed image signal; and iii) reproducing a visible image from said processed image signal.

2. A method as defined in claim 1 further comprising:

forming a histogram of said image signal;

calculating dynamic range of said image signal in accordance with said histogram; and setting a rate of dynamic range compression of said image signal in accordance with said dynamic range, said step of dynamic range compressing being performed in accordance with said rate of dynamic range compression.

3. A method as defined in claim 1 wherein said IIR filter comprises a low-pass type of IIR filter connected to an all-pass type of IIR filter, in a cascade arrangement.

4. A method as defined in claim 1 further comprising converting said image signal into a luminance signal;

said step i) of filtering being performed on said luminance signal with said IIR filter, and said unsharp image signal is thereby formed.

5. An image reproducing apparatus, wherein a visible image is reproduced from a digital image signal representing a color image, the apparatus comprising:

i) an unsharp image signal former filtering the image signal using an IIR filter, and thereby forming an unsharp image signal, which represents an unsharp image of the color image, ii) a dynamic range compressor dynamic range compressing the image signal using said unsharp image signal, and thereby obtaining a processed image signal, and iii) reproduction means for reproducing a visible image from said processed image signal.

6. An apparatus as defined in claim 5 wherein said dynamic range compressor includes, a histogram generator generating a histogram of said image signal, a dynamic range calculator calculating a dynamic range of said image signal in accordance with said histogram, and a dynamic range compression setter, setting a rate of dynamic range compression of said image signal, in accordance with said dynamic range calculated by said dynamic range calculator, said dynamic range compressor compressing the image signal in accordance with said rate of dynamic range compression set by said dynamic range compression setter.

7. An apparatus as defined in claim 5 wherein said IIR filter comprises a low-pass type of IIR filter connected to an all-pass type of IIR filter, in a cascade arrangement.

8. An apparatus as defined in claim 5 wherein the apparatus further comprises conversion means for converting said image signal into a luminance signal;

said unsharp image signal former carrying out said filtering process on said luminance signal using said IIR filter, thereby forming said unsharp image signal.

9. An image reproducing method, wherein a visible image is reproduced from a digital image signal representing a color image, the method comprising the steps of:

i) carrying out a filtering process on the image signal and with an IIR filter such that said filtering process may proceed forward and backward at least a single time with respect to a predetermined direction on the color image or with respect to each of said predetermined direction and a direction different from said predetermined direction, an unsharp image signal, which represents an unsharp image of the color image, being thereby formed, ii) carrying out a dynamic range compressing process on the image signal and in accordance with said unsharp image signal, a processed image signal being thereby obtained, and iii) reproducing a visible image from said processed image signal.

10. A method as defined in claim 9 further comprising:

forming a histogram of said image signal, calculating a dynamic range of said image signal based on said histogram, and setting a rate of dynamic range compression based on said dynamic range calculated by said step of calculating;

said step ii) of dynamic range compressing being performed based said rate of dynamic range compression determined by said substep of setting a rate of dynamic range compression.

11. A method as defined in claim 9 further comprising enlarging the visible image reproduced from said processed image signal with a predetermined enlargement scale factor.

12. A method as defined in claim 11 further comprising altering a filter factor of said IIR filter in accordance with said predetermined enlargement scale factor.

13. A method as defined in claim 11 further comprising varying the number times of said step i) of filtering with said IIR filter is performed in accordance with said predetermined enlargement scale factor.

14. A method as defined in claim 9 further comprising converting said image signal into a luminance signal, said step i) of said filtering being performed on said luminance signal with said IIR filter to form said unsharp image signal.

15. The method of claim 9 wherein said step i) of filtering also proceeds forwards and backwards with respect to a direction different from said predetermined direction.

16. An image reproducing apparatus, wherein a visible image is reproduced from a digital image signal representing a color image, the apparatus comprising:

i) an unsharp image signal former for filtering the image signal with an IIR filter forward and backward at least a single time with respect to a predetermined direction on the color image to form an unsharp image signal which represents an unsharp image of the color image;

ii) a dynamic range compressor dynamic range compressing the image signal in accordance with said unsharp image signal, thereby obtaining a processed image signal; and iii) reproduction means for reproducing a visible image from said processed image signal.

17. A method as defined in claim 16 further comprising:

forming a histogram of said image signal, calculating a dynamic range of said image signal based on said histogram, and setting a rate of dynamic range compression based on said dynamic range calculated by said step of calculating; said step of dynamic range compressing being performed based said rate of dynamic range compression determined by said substep of setting a rate of dynamic range compression.

18. An apparatus as defined in claim 16 wherein said reproduction means reproduces the visible image from said processed image signal by enlarging the visible image with a predetermined enlargement scale factor.

19. An apparatus as defined in claim 18 wherein said unsharp image signal former alters a filter factor of said IIR filter in accordance with said predetermined enlargement scale factor.

20. An apparatus as defined in claim 18 wherein said unsharp image signal former alters the number of times said filtering process is carried out with said IIR filter, the alteration being carried out in accordance with said predetermined enlargement scale factor.

21. An apparatus as defined in claim 16 wherein the apparatus further comprises conversion means for converting said image signal into a luminance signal;

said unsharp image signal former performing said filtering on said luminance signal with said IIR filter, thereby forming said unsharp image signal.

22. The apparatus of claim 16 wherein said unsharp image signal former also filters forward and backward with respect to a direction different from said predetermined direction.

* * * * *